(12) United States Patent
Takayama et al.

(10) Patent No.: US 7,603,190 B2
(45) Date of Patent: Oct. 13, 2009

(54) DIGITAL RECORDING/REPRODUCING APPARATUS

(75) Inventors: Masamichi Takayama, Tokyo (JP); Tetsuo Kani, Kanagawa (JP); Fumitoshi Ishida, Kanagawa (JP); Kenji Yamasaki, Kanagawa (JP); Takao Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 1315 days.

(21) Appl. No.: 10/344,866

(22) PCT Filed: Apr. 19, 2002

(86) PCT No.: PCT/JP02/03959

§ 371 (c)(1),
(2), (4) Date: Feb. 14, 2003

(87) PCT Pub. No.: WO02/086869

PCT Pub. Date: Oct. 31, 2002

(65) Prior Publication Data

US 2004/0047608 A1 Mar. 11, 2004

(30) Foreign Application Priority Data

Apr. 19, 2001 (JP) ............................ 2001-1205320

(51) Int. Cl.
*G06F 17/00* (2006.01)
(52) U.S. Cl. ..................... 700/94; 369/1; 369/2; 369/3; 369/4; 369/5
(58) Field of Classification Search .................... 700/94
See application file for complete search history.

(56) References Cited

U.S. PATENT DOCUMENTS

| 4,206,476 | A | * | 6/1980 | Hashimoto | .................. 386/101 |
| 4,492,989 | A | * | 1/1985 | Watanabe et al. | ............. 360/32 |
| 4,617,599 | A | * | 10/1986 | Noguchi et al. | ............... 360/32 |
| 4,660,103 | A | * | 4/1987 | Wilkinson et al. | .......... 714/752 |
| 4,903,019 | A | * | 2/1990 | Ito | ............................. 341/61 |
| 4,937,686 | A | * | 6/1990 | Arai et al. | ..................... 360/32 |
| 5,351,092 | A | * | 9/1994 | Poimboeuf et al. | .......... 348/512 |

(Continued)

FOREIGN PATENT DOCUMENTS

JP 62-114161 5/1987

(Continued)

*Primary Examiner*—Curtis Kuntz
*Assistant Examiner*—Paul McCord
(74) *Attorney, Agent, or Firm*—Frommer Lawrence & Haug LLP; William S. Frommer; Thomas F. Presson

(57) ABSTRACT

Based on a digital recorder/player taken as a basic apparatus and which accommodates a field frequency of 60 fields/sec or a frame frequency of 30 frames/sec, an apparatus is implemented to record or reproduce source video and audio signal originated from the basic apparatus and whose frequency is different from the field or frame frequency. The apparatus includes an input unit, a processor, and a converter provided between the input unit and the processor. The input unit accepts audio data having a specific field frequency and arranged in a specific format, and make baseband processing of the audio data. The processor is designed to process audio data having a basic field frequency (60 fields/sec) and arranged in a basic format. It operates with a clock corresponding to the sampling frequency to make error-corrective encoding of the audio data adapted to the basic format.

13 Claims, 22 Drawing Sheets

U.S. PATENT DOCUMENTS

| | | | | |
|---|---|---|---|---|
| 5,355,132 | A | * | 10/1994 | Kani et al. .................... 341/55 |
| 5,583,707 | A | * | 12/1996 | Seki ............................ 360/48 |
| 5,805,604 | A | * | 9/1998 | Nishikawa ................. 714/701 |
| 5,822,327 | A | * | 10/1998 | Satou ......................... 370/505 |
| 6,147,823 | A | * | 11/2000 | Matsumi et al. ................ 360/8 |
| 6,219,043 | B1 | * | 4/2001 | Yogeshwar et al. ........... 341/55 |
| 6,282,242 | B1 | * | 8/2001 | Isozaki et al. .......... 375/240.04 |
| 6,438,316 | B1 | * | 8/2002 | Henmi et al. ................ 386/95 |
| 6,502,071 | B1 | * | 12/2002 | Nagasaki ................... 704/226 |
| 6,508,596 | B1 | * | 1/2003 | Matsumi et al. ................ 360/8 |
| 6,950,603 | B1 | * | 9/2005 | Isozaki et al. ................ 386/95 |
| 2003/0026590 | A1 | * | 2/2003 | Todo et al. .................... 386/47 |

FOREIGN PATENT DOCUMENTS

| | | |
|---|---|---|
| JP | 62-150562 | 7/1987 |
| JP | 62-219266 | 9/1987 |
| JP | 63-29366 | 2/1988 |
| JP | 9-130739 | 5/1997 |
| JP | 9-247625 | 9/1997 |
| JP | 11-18052 | 1/1999 |
| JP | 11-96693 | 4/1999 |
| JP | 2000-149456 | 5/2000 |
| JP | 2000-152149 | 5/2000 |

* cited by examiner

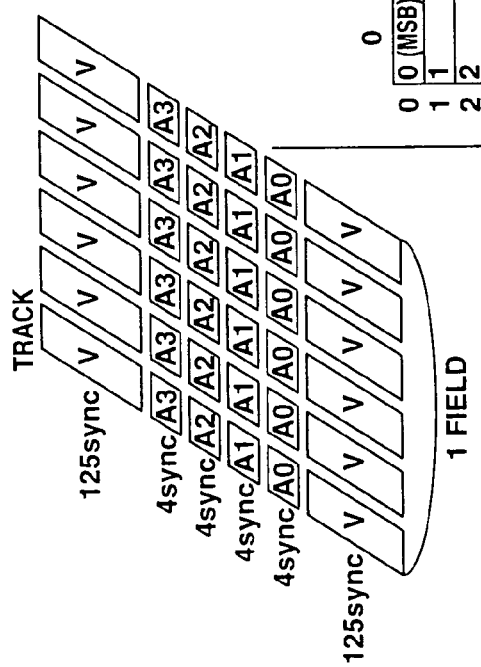
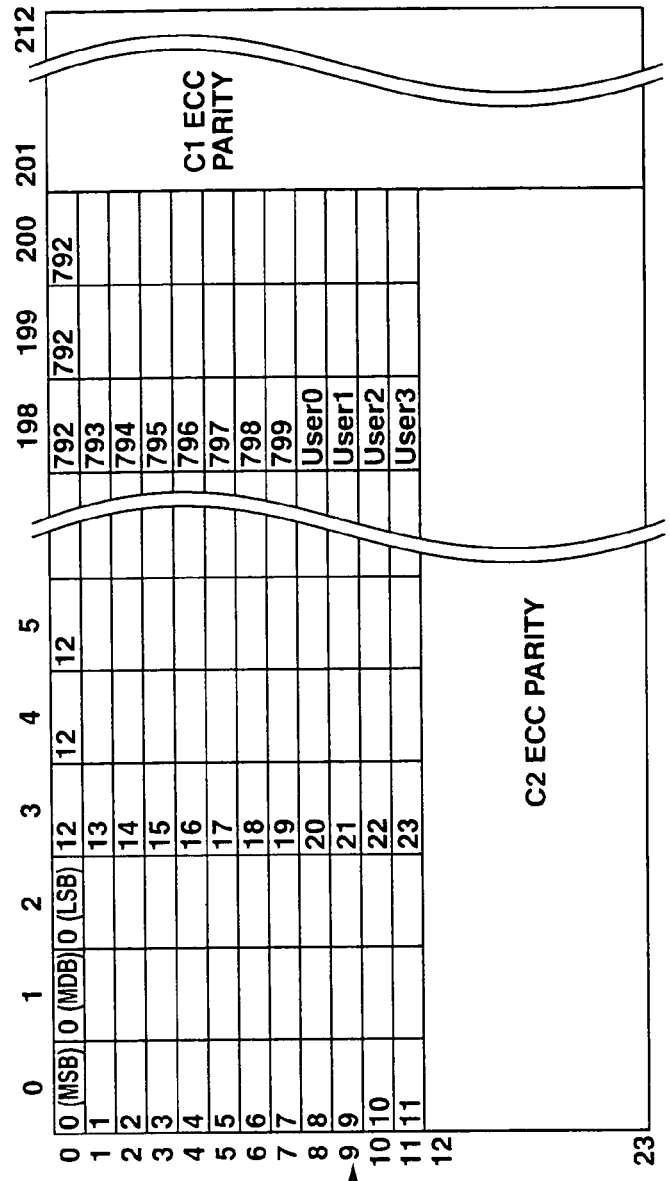
FIG.4A
FIG.4B

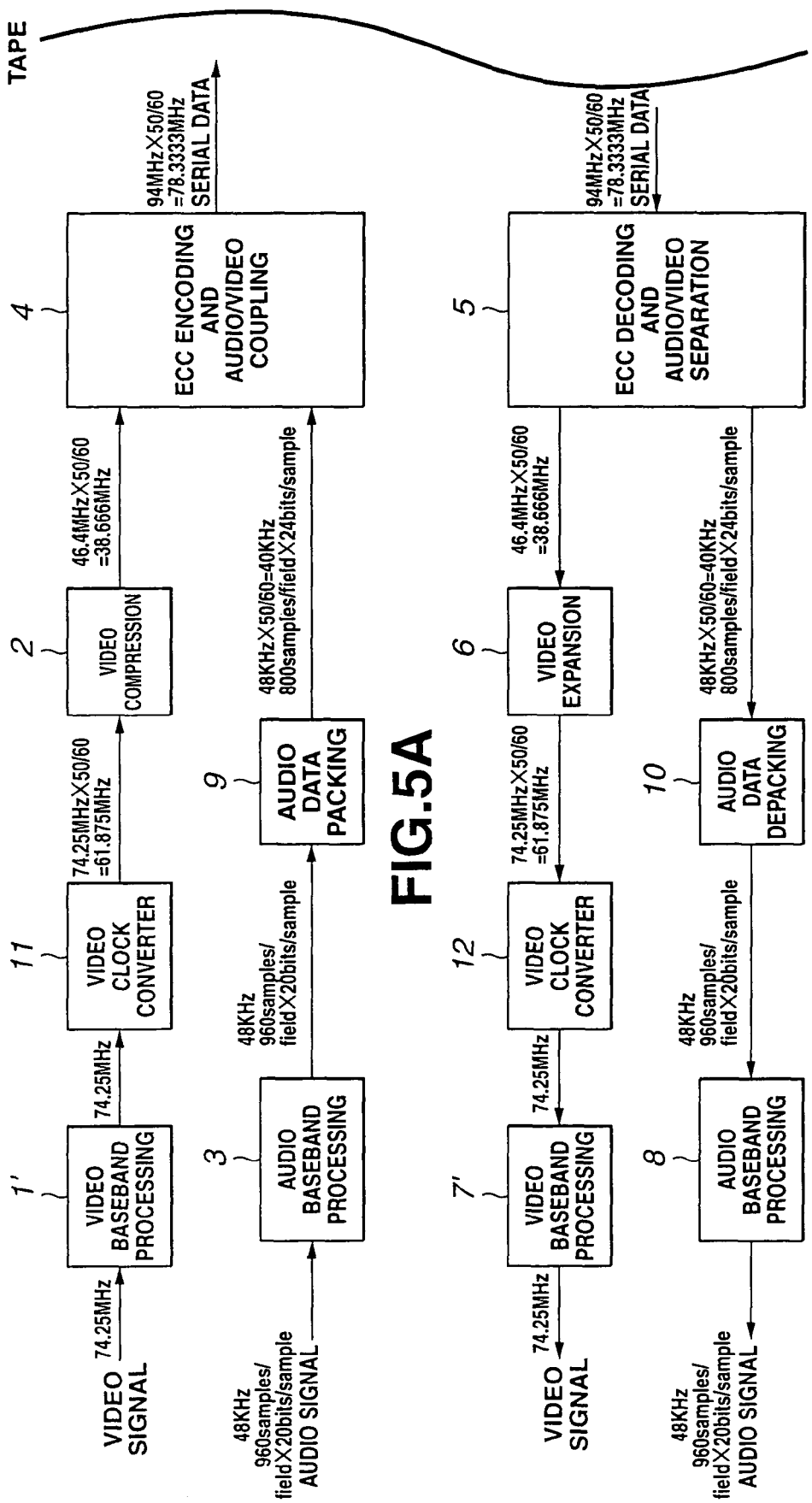

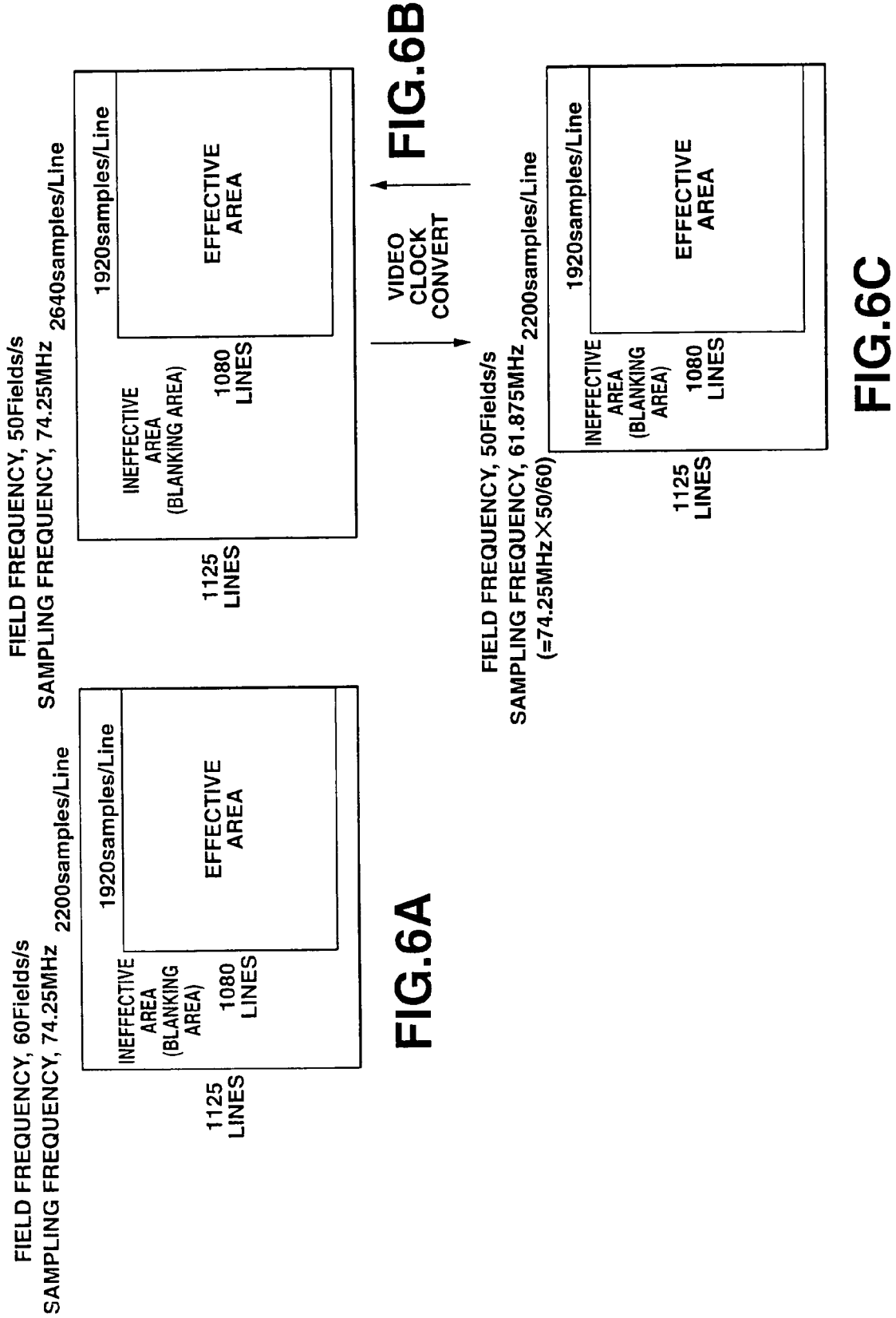

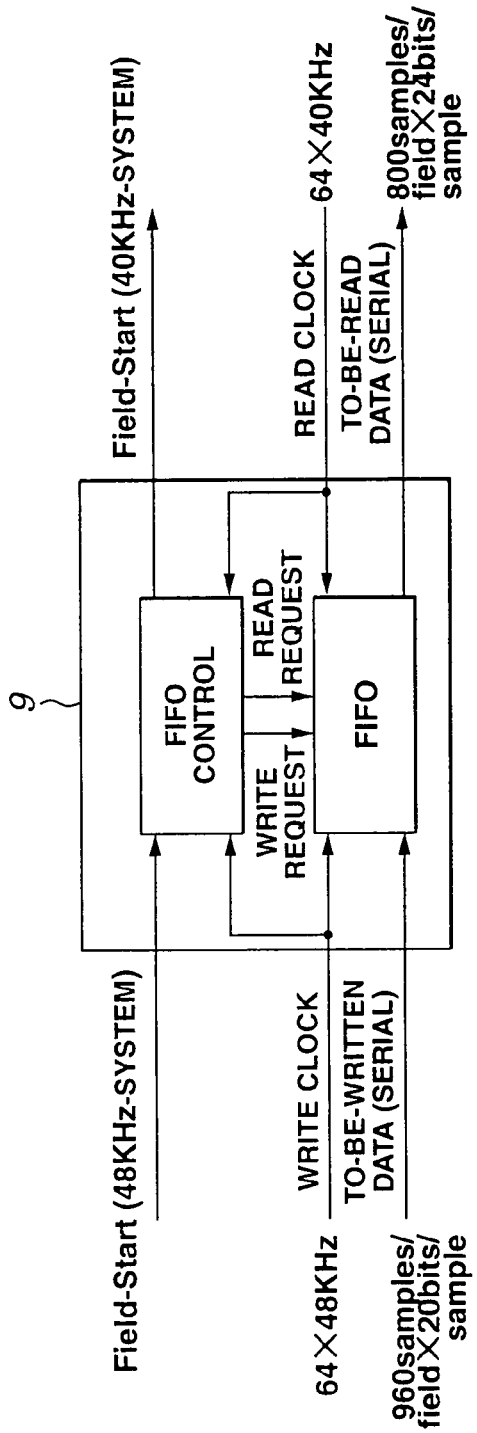
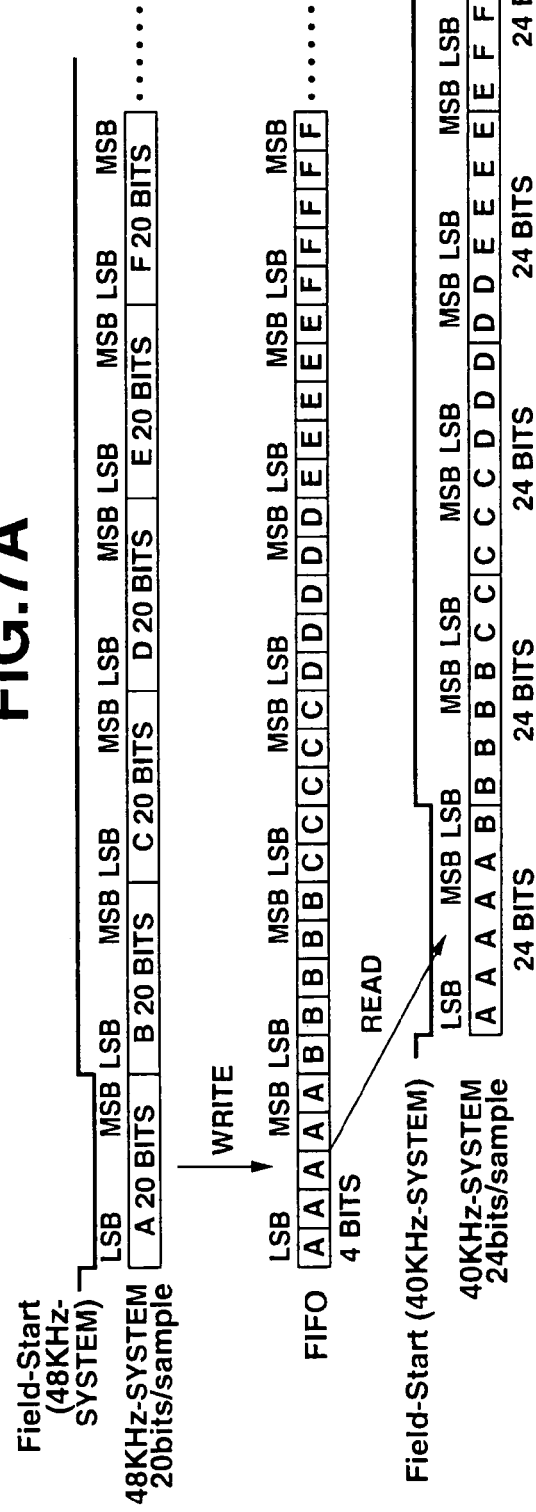
FIG.7A
FIG.7B

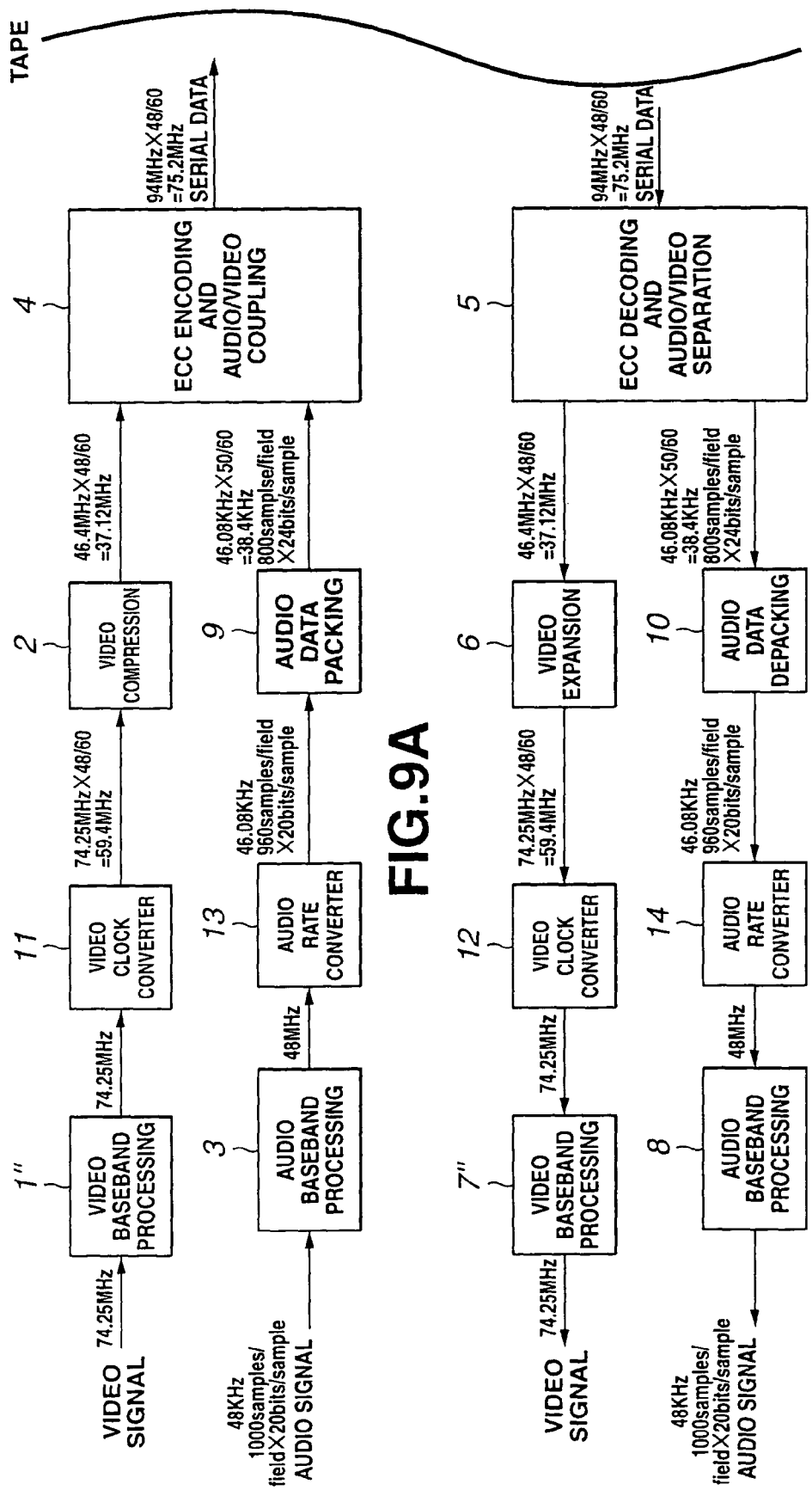

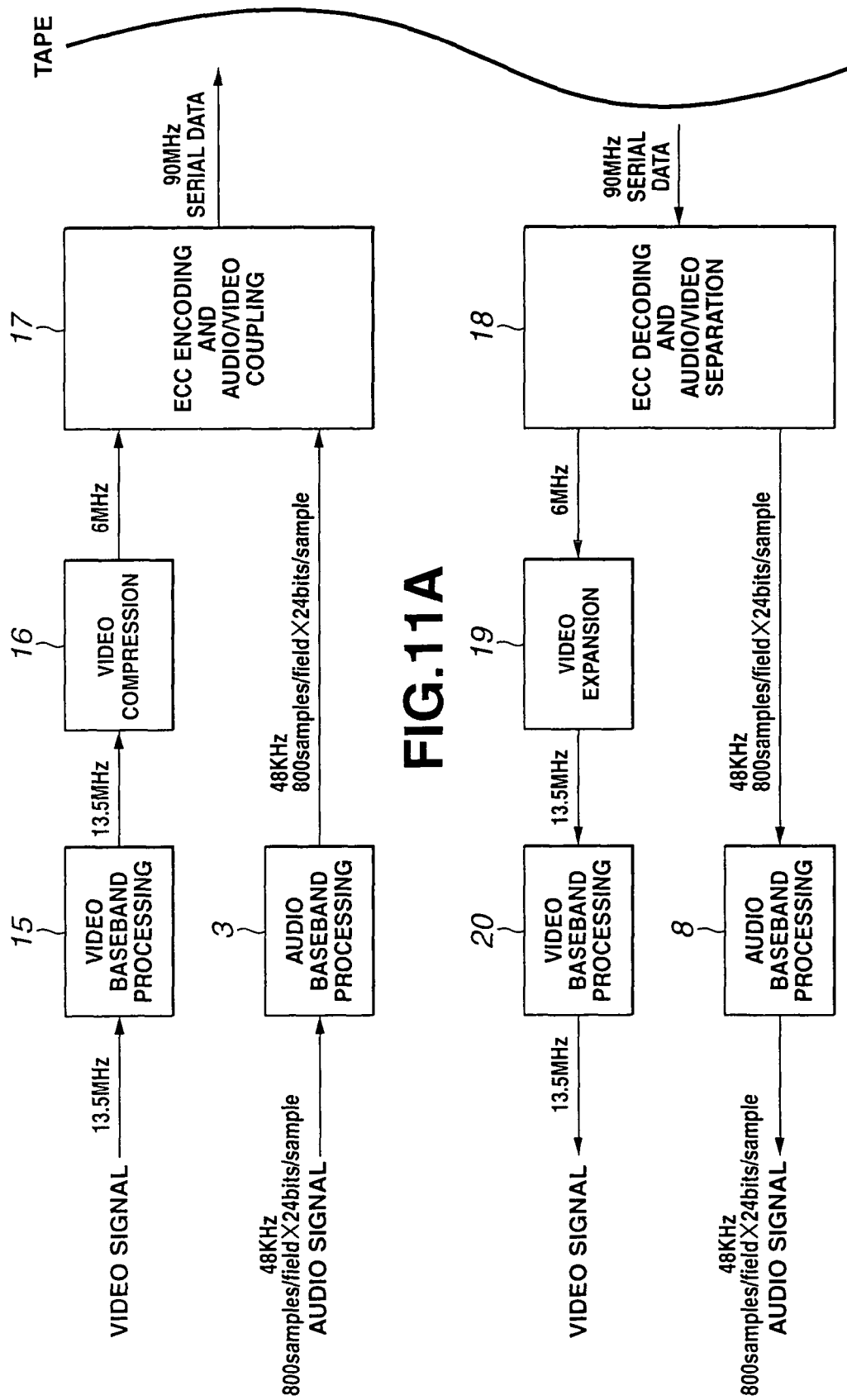

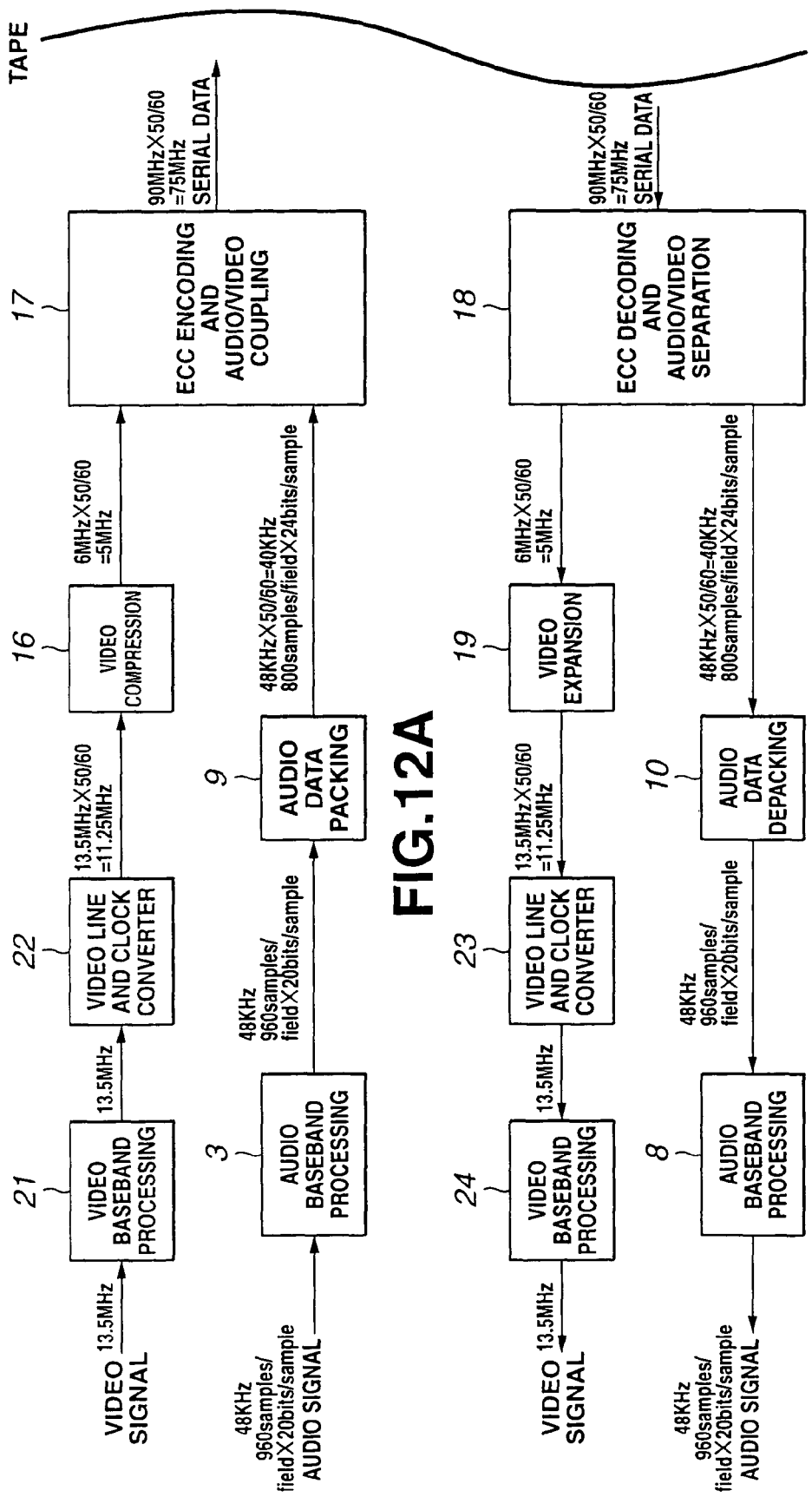

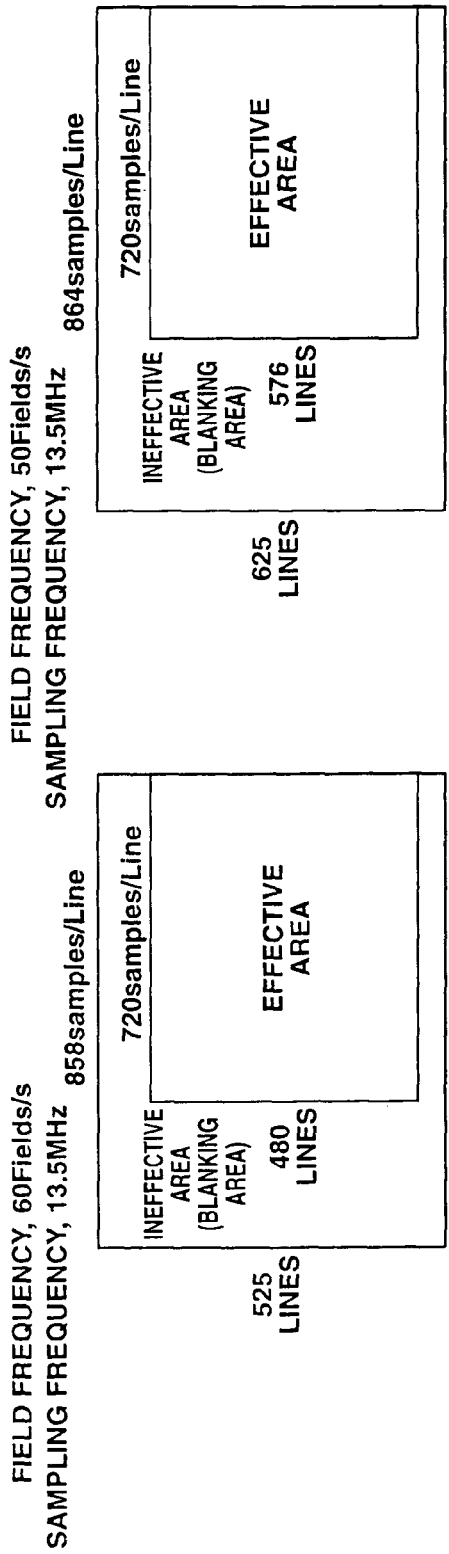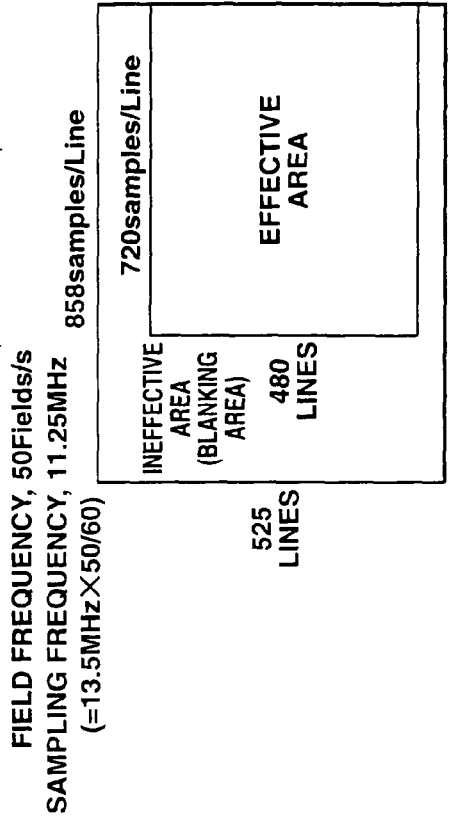

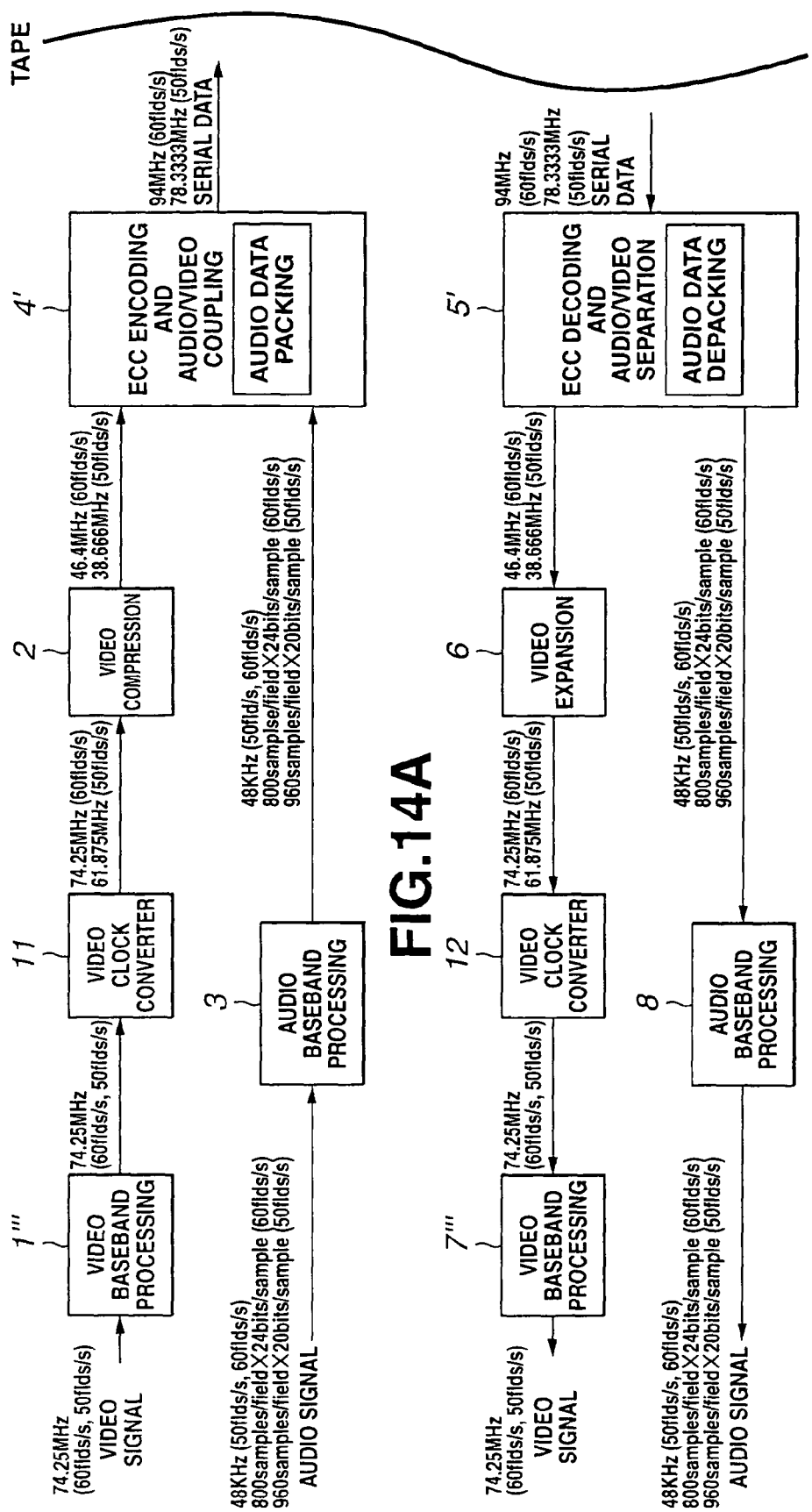

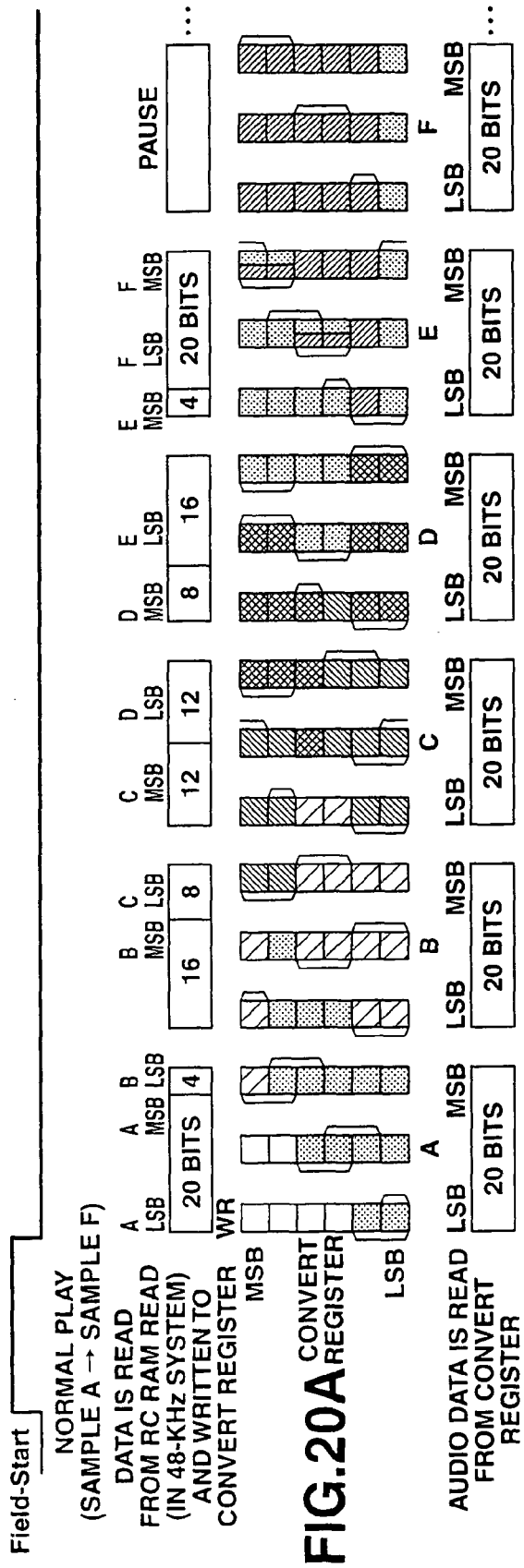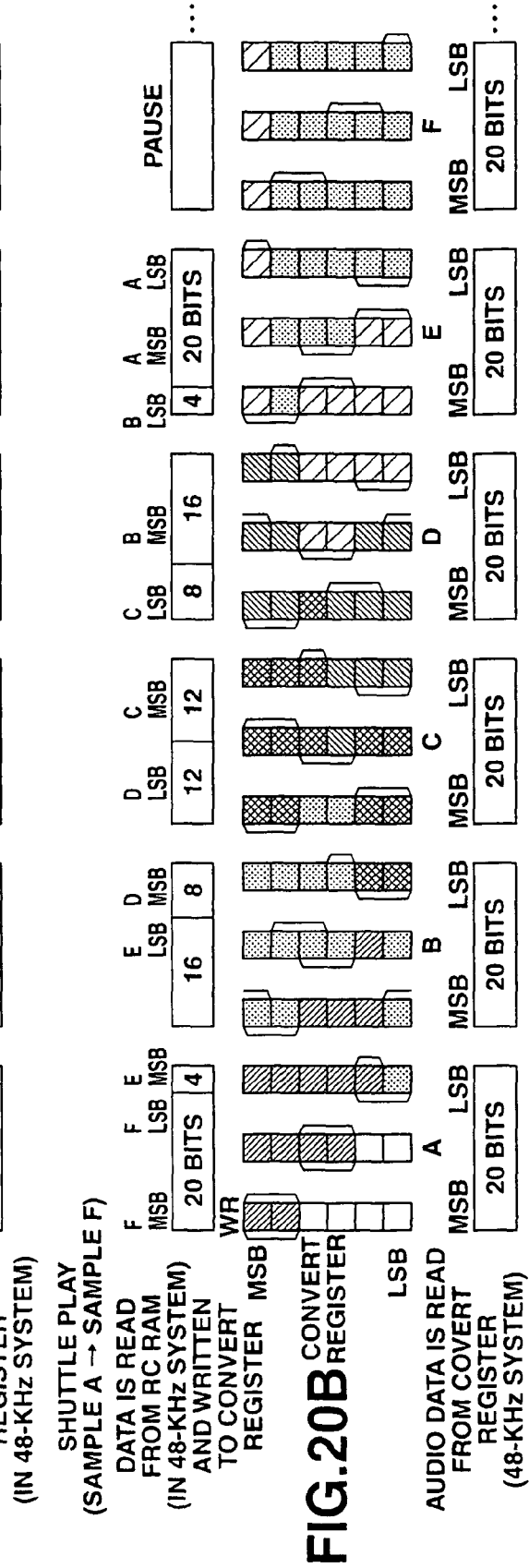

DIGITAL RECORDING/REPRODUCING APPARATUS

TECHNICAL FIELD

The present invention generally relates to a digital audio recording method and apparatus, a digital audio playing method and apparatus, a digital video recording method and apparatus, a digital video playing method and apparatus and a digital video recording method and apparatus, and more particularly to implementing, based on a recording/playing apparatus taken as a basic apparatus and which accommodates audio or video data of a field frequency, a recording/playing apparatus which accommodates audio or video data different in field frequency from the audio or video data accommodated by the basic apparatus. More specifically, the present invention is directed to simplification of a recording/playing apparatus, for example, audio and video sections of a VTR. However, it should be noted that the present invention is not limited to any VTR.

BACKGROUND ART

The recording/playing apparatus such as a VTR will be very convenient if it can record or reproduce signals defined according to a plurality of different television standards. More particularly, the VTR should desirably be capable of recording or reproducing signals used in the television systems (TV system) adopted in all countries, respectively, over the world such as Japan, USA and Europe. The HDTV (high-definition television) system was first developed in Japan to display a higher-definition picture than the conventional TV system. In Japan, the HDTV system is called "Hi-Vision" system and defined as using 1125 scanning lines and a field frequency of 60 Hz. On the other hand, the HDTV systems in the Europe and USA are different in various aspects from the Hi-Vision system in Japan. For example, the field frequency in the European HDTV system is 50 Hz.

The TV system varies among the countries as above, and hence TV equipment and materials used in a country for program production and broadcasting are thus inevitably different from those used in another country. Namely, the TV equipment and materials for production and broadcasting have to developed and manufactured for conformity with the different TV systems, respectively, which will lead to large costs of program production and broadcasting. Also, for playing a software produced in compliance with a TV system, a VTR conforming to that TV system has to be used and TV signals have to be converted in format by a separate format converter for re-recording to the VTR, which will also lead to increased labor and cost.

The VTR is one of the essential equipment and materials for producing and broadcasting a program. Generally, since the broadcasting VTRs are at heavy prices, so it is desired that a tape transport, signal processing circuit, tape cassette and the like are usable in common between VTRs conforming to different HDTV systems. This will lead to a reduction of the equipment costs and running costs and also be very profitable to the users. Also, if a tape having a program recorded therein in compliance with a plurality of different TV systems can be played in the same VTR, the program can advantageously be exchanged among the countries adopting the different TV systems, respectively, at low costs.

However, the conventional magnetic recording/playing apparatuses like a VTR do not incorporate any recording/playing mechanism common to such different HDTV systems and thus cannot record and reproduce any high-definition video data and audio data produced in compliance with the HDTV systems. For an apparatus capable of recording and reproducing signals different in field frequency from each other, a processor was required which formats each of the signals of different field frequencies for the signals to be dealt with in the apparatus. Assume here for example that there are two apparatuses one of which accommodates signals having a field frequency of 60 fields/sec, audio input/output sampling frequency of 48 kHz and a number of bits per sample of 24 and the other accommodates signals of 50 fields/sec in field frequency, 48 kHz in audio input/output sampling frequency and of 24 in number of bits per sample. It should be noted that the apparatus for data of 60 fields/sec in field frequency will also be referred to as "60-fields/sec apparatus or VTR" hereunder and the apparatus for data of 50 fields in field frequency will also be referred to as "50-fields/sec apparatus or VTR" hereunder. In this case, the audio format for the 60-kHz apparatus should be 800 samples/field×24 bits/sample, and that for the 50-kHz apparatus be 960 samples/field×24 bits/sample. Between these signals, there is a large difference in total number of bits per field. Namely, the total number of bits per field of the signal having the field frequency of 60 fields/sec is 800×24(=19200) while that of the signal of 50 fields/sec is 960×24(=23040). Therefore, the apparatuses for recording and reproducing signals of different field frequencies are inevitably quite different in format from each other.

Also, the video frame varies between field frequencies. Therefore, an apparatus for a signal of one field frequency was unavoidably quite different in signal format from an apparatus for a signal of another field frequency.

DISCLOSURE OF THE INVENTION

Accordingly, the present invention has an object to overcome the above-mentioned drawbacks of the related art by implementing, based on a digital audio recording/playing apparatus taken as a basic apparatus and which accommodates a field frequency, a digital audio recording/reproducing apparatus which can accommodate audio data of a field frequency different from that for the basic apparatus by converting the audio data into a format suitable for the basic apparatus and which can be processed at an appropriate rate.

Also the present invention has another object to implement, based on a digital video recording/playing apparatus taken as a basic apparatus and which accommodates a field frequency, a digital video recording/playing apparatus which can recording or reproducing video data different in field frequency from that accommodated by the basic apparatus by converting the video data into a format suitable for the basic apparatus and which can be processed at an appropriate rate.

To overcome the above-mentioned drawbacks of the related art and attain the above object, the present invention provides a digital audio recording apparatus constructed as will be described below. Namely, the digital audio recording apparatus includes, according to the present invention, an input unit for accepting audio data having a predetermined sampling frequency and specific field frequency and a specific format in which specific data array and bit array are defined in units of a field, and making at least baseband processing of the audio data, a processor designed to process the audio data having the predetermined sampling frequency and a basic field frequency and a basic format in which the basic data array and bit array are defined in units of a field, and operate with a clock corresponding to the sampling frequency to make error-corrective encoding of the audio data adapted to the basic format, an output unit for writing the audio data output from the processor to a recording medium, and a converter provided between the input and processor. When the specific field frequency of the audio data is different from the basic one and the specific format is different from the basic one, the converter converts the sampling frequency at a ratio between the specific field frequency and basic one while adapting the specific format to the basic one, before passing the audio data thus processed to the processor which will operate with a clock corresponding to the converted sampling frequency to make error-corrective encoding of the audio data adapted to the basic format.

Specifically, the converter adapts the specific format to the basic one by changing the number of samples per field and number of bits per sample in combination while maintaining the total number of bits per field which depends upon the product of the number of samples per field and number of bits per sample, and converts the sampling frequency by changing the number of samples per field. Further, in case the total number of bits per field which depends upon the product of the number of samples per field and number of bits per sample varies between the specific format an the basic one, the converter corrects the number of samples per field by converting the sampling frequency of the input audio data, and adjusts the corrected total number of bits per field to the total number of bits per field which depends upon the product of the corrected number of samples per field and number of bits per sample. Alternatively, when the total number of bits per field which depends upon the product of the number of samples per field and number of bits per sample varies between the specific format and basic one, the converter may correct the total number of bits by adding dummy data corresponding to the deficit bits to the specific format and adjust the total number of specific-formatted bits to that of basic-formatted bits. Preferably, the converter should adapt the specific format to the basic one by writing audio data consisting of a bit stream of serially arranged samples to FIFO in units of a number of specific-formatted bits, reading the audio data in units of a number of basic-formatted bits, and changing the number of samples per field and number of bits per samples in combination. In this case, the converter will adapt the specific format to the basic one by controlling the write and read of the audio data to and from the FIFO synchronously with the specific field frequency.

According to a variant of the above digital audio recording/playing apparatus, the processor incorporates the converter as a conversion means and further includes a coding means for making error-corrective encoding of audio data. When the specific field frequency of the audio data is different from the basic field frequency and the specific format is different from the basic one, the conversion means adapts the specific format to the basic one before passing the audio data to the coding means, and the coding means operates with a clock corresponding to the predetermined sampling frequency to make error-corrective encoding of the audio data adapted to the basic format with a pause taken as needed at a rate corresponding to the ratio between the specific field frequency and basic one. More specifically, the conversion means converts the specific format to the basic one by changing the number of samples per field and number of bits per sample in combination while maintaining the total number of bits per field which depends upon the product of the number of samples per field and number of bits per sample. Further specifically, the conversion means includes as many registers as bits per basic-formatted sample, and converts the specific format into the basic one by cyclically writing audio data having a specific format consisting of a bit stream of serially arranged samples to the registers while cyclically reading the audio data from the registers with a pause taken as needed at a rate corresponding to the ratio between the number of bits per specific-formatted sample and number of bits per basic-formatted sample and thus changing the number of samples per field and number of bits per sample in combination.

Also the above object can be attained by providing a digital audio playing apparatus including, according to the present invention, an input unit for reading, from a recording medium, audio data having a sampling frequency and specific field frequency and adapted to a basic format in which a basic data array and bit array are defined in units of a field, a processor designed to process audio data having a predetermined sampling frequency and basic field frequency and arranged in the basic format, and operate with a clock corresponding to the sampling frequency to decode the audio data adapted to the basic format for at least error correction of the audio data, an output unit for making at least baseband processing of the audio data output from the processor and supplying the audio data to a playback device, and a converter provided between the processor and output unit. The processor can operate with the clock corresponding to the sampling frequency of the read audio data to make error-corrective decoding of the audio data adapted to the basic format. When the specific field frequency of the read audio data is different from the basic one and the specific format is different from the basic one, the converter restores the audio data once adapted to the basic format to the specific format, converts the sampling frequency of the read audio data into the predetermined one at a ratio between the specific field frequency and basic one before passing the audio data to the output unit.

Specifically, the converter restores the audio data from the basic format to the specific one by changing the number of samples per field and number of bits per sample in combination while maintaining the total number of bits per field which depends upon the product of the number of samples per field and number of bits per sample, and converts the sampling frequency by changing the number of samples per field. It should be noted that when the total number of bits per field which depends upon the product of the number of samples per field and number of bits per sample varies between the specific format and the basic one, the converter corrects the number of samples per field by converting the sampling frequency of the audio data once restored from the basic format approximately to the specific one, and finally converts the audio data into the specific format. Alternatively, when the total number of bits per field which depends upon the product of the number of samples per field and number of bits per sample varies from the specific format to the basic one, the converter may restore the audio data approximately to the specific format by adding excess dummy data to the audio data once adapted to the basic format, and then finally convert the audio data into the specific format by removing the dummy data from the audio data. Preferably, the converter should restore the basic format to the specific one by writing audio data consisting of a bit stream of serially arranged samples to FIFO in units of the number of basic-formatted bits, reading the audio data in units of the number of specific-formatted bits, and changing the number of samples per field and number of bits per samples in combination. In this case, the converter will restore the basic format to the specific one by controlling the write and read of the audio data to and from the FIFO synchronously with the specific field frequency.

According to a variant of the above digital audio playing apparatus, the processor incorporates the converter as a conversion means and further includes a decoding means for making error-corrective decoding of audio data. The decoding means operates with a clock corresponding to the predetermined sampling frequency, and makes error-corrective decoding audio data adapted to the basic format with a pause taken as needed at a rate corresponding to the ratio between the specific field frequency and basic one. When the specific field frequency of the read audio data is different from the basic field frequency and the specific format is different from the basic one, the conversion means restores the audio data once adapted to the basic format to the specific one before passing the audio data to the output unit. Specifically, the conversion means restores the basic format to the specific one by changing the number of samples per field and number of bits per sample in combination while maintaining the total number of bits per field which depends upon the product of the number of samples per field and number of bits per sample. More specifically, the conversion means includes as many registers as bits per basic-formatted sample, and restores the basic format to the specific format by cyclically writing basic-formatted audio data to the registers with a pause taken as needed at a rate corresponding to the ratio between the number of bits per basic-formatted sample and number of bits per specific-formatted sample and cyclically reading the audio data from the registers while delimiting the audio data with the number of bits per specific-formatted sample, and changing the number of bits per field and number of bits per sample in combination. It should-be noted that for forward play or reverse play of audio data, whichever should selectively be done in writing or reading the audio data to or from the registers, the conversion means starts with MSB of a bit string for the forward play or with LSB of a bit string for the reverse play.

According to another variant of the above digital audio playing apparatus, a shuttle play control unit is also provided. The converter restores the audio data from the basic format to the specific one by changing the number of samples per field and number of bits per sample in combination while maintaining the total number of bits per field which depends upon the product of the number of samples per field and number of bits per sample. For shuttle play of audio data of different fields, the shuttle play control unit passes, to the output unit, only valid ones, including a correct bit string, of the samples restored by the converter to the specific format. Preferably, the shuttle play control unit should pass, to the output unit, substitute samples obtained by interpolating the valid samples instead of invalid ones, having no correct bit string, of the samples restored to the specific format. Also, the shuttle play control unit may substitute zero for an incorrect bit string in at least a part of an invalid one, including correct and incorrect bit strings, among the samples restored to the specific format, and convert the data part into a valid sample before passing it to the output unit.

Also the above object can be attained by providing a digital video recording apparatus including, according to the present invention, an input unit for accepting video data having a predetermined sampling frequency and a specific field frequency and arranged in a frame-related specific format and making at least baseband processing of the video data, a processor designed to process the video data having the predetermined sampling frequency and a basic field frequency and arranged in a frame-related basic format, and operate with a clock corresponding to the sampling frequency to compress, and make error-corrective encoding of, the video data adapted to the basic format, an output unit for writing video data output from the processor to a recording medium, and a converter provided between the input and processor. When the specific field frequency of the video data is different from the basic one and the specific format of the video data is different from the basic one, the converter converts the sampling frequency at the ratio between the specific field frequency and basic one while adapting the specific format to the basic one, before passing the video data to the processor which will operate with a clock corresponding to the converted sampling frequency to compress, and makes error-corrective encoding of, the video data adapted to the basic format.

Specifically, when the specific format coincides with the basic one, the converter changes the sampling frequency at a ratio between the specific field frequency and basic one while maintaining the specific format, before passing the video data to the processor. More specifically, when the specific format coincides with the basic one, the converter changes the sampling frequency by adjusting the invalid data not included in the frame while maintaining the specific format with the valid data included in the frame being kept as it is. When the specific format is different from the basic one, the converter converts the specific format to the basic one and then changes the sampling frequency at a ratio between the specific and basic field frequencies before passing the video data to the processor. More particularly, when the number of lines of data included in the specific-formatted frame is different from that in the basic-formatted frame, the converter converts the specific format to the basic one by adjusting the number of lines in the data included in the frame.

Also the above object can be attained by providing a digital video playing apparatus including, according to the present invention, an input unit for reading, from a recording medium, video data having a sampling frequency and specific field frequency and adapted to a frame-related basic format, a processor designed to process video data having a predetermined sampling frequency and basic field frequency and arranged in the basic format, and operate with a clock corresponding to the sampling frequency to make error-corrective decoding of, and expand, the video data adapted to the basic format, an output unit for making at least baseband processing of video data output from the processor and supplying the video data to a playback device, and a converter provided between the processor and output unit. The processor can operate with a clock corresponding to the sampling frequency of the read video data to make error-corrective decoding of, and expand, the video data adapted to the basic format. When the specific field frequency of the read video data is different from the basic one and the specific format is different from the basic one, the converter restores the video data once adapted to the basic format back to the specific format, converts the sampling frequency of the read video data and basic one into the predetermined sampling frequency at a ratio between the specific field frequency before passing the video data to the output unit.

Specifically, when the specific format is the same as the basic one, the converter passes the video data to the output unit after converting the sampling frequency at a ratio between the specific and basic field frequencies while maintaining the specific format. More specifically, when the specific format is the same as the basic format, the converter converts the sampling frequency by adjusting the invalid data not included in the frame while maintaining the specific format with the valid data included in the frame being kept at it is. When the specific format is different from the basic format, the converter passes the video data to the output unit after restoring the video data once adapted to the basic format to the specific format and then converting the sampling frequency at a ratio between the specific and basic field frequencies. For example, when the number of lines of data included in the specific-formatted frame is different from that of data included in the basic-formatted frame, the converter restores the video data to the specific format by adjusting the number of lines of the data included in the frame.

The audio data will be processed as follows. In the recorder section of the apparatus, the clock for the audio processor which is a block nearer from the audio data converter to a recording medium to or from which data is to be written or read is a clock corresponding to a ratio in field frequency between the basic apparatus and an apparatus implemented based on the basic apparatus (will also be referred to as "intended apparatus" hereunder). For example, it is assumed that a VTR for audio data of 60 fields/sec in field frequency and 48 kHz in audio processing clock frequency is a basic apparatus. In this case, the audio processing clock frequency for a VTR implemented, based on the basic apparatus, to write and read audio data having the field frequency of 50 fields/sec is 48 kHz×50/60(=40 kHz).

The audio processing clock to a block nearer from the audio data converter to the input unit of the apparatus (farther from the recording medium) is an input clock frequency to the apparatus. For example, it is assumed that a 50-fields/sec apparatus implemented, based on the basic apparatus for data having a field frequency of 60 fields/sec and a format of 800 samples/field×24 bits/sample (with sampling frequency of 48 kHz), records audio data in a format of 960 samples/field×20 bits/sample (with sampling frequency of 48 kHz). In this case, the clock for both blocks nearer from the audio data converter to the input unit of the apparatus (farther from the recording medium) is a clock of 48 kHz. Therefore, both the basic and intended apparatuses make baseband processing of the audio data with 48 kHz and can share the same circuit.

In a block of the audio data converter nearer to the input unit of the apparatus (farther from the recording medium), audio data is processed to have such a number of samples per field and number of bits per sample that the total number of bits per field is the same as in an apparatus for audio data of the basic field frequency. For example, it is assumed that audio data has been recorded in a format of 800 samples/field×24 bits/sample by an apparatus for audio data having the basic field frequency of 60 fields/sec. In this case, an apparatus for audio data having a field frequency of 50 fields/sec will record audio data in a format of 960 samples/field×20 bits/sample. The total number of bits per bit for both the apparatuses is 19200 bits/sec. The input sampling frequency for the intended apparatus can be made the same as that in the basic apparatus by changing the number of bits per sample from that in the basic apparatus as in this example. In this example, the sampling frequency in both the apparatuses for the field frequencies of 60 and 50 fields/sec, respectively, is 48 kHz.

The number of samples per field and number of bits per sample for a block of the audio data converter nearer to the input unit of the apparatus are determined as above. When they are the same as those for the input unit of the apparatus, they can easily be determined. For a convenience of the intended field frequency, however, there are not available any suitable number of samples per field and number of bits per sample in some cases. Also, for a convenience of an intended apparatus, the number of samples per field and number of bits per sample for the input unit of the apparatus should desirably be arbitrary in some cases, In such a case, there will be determined such a number of samples per field (will affect the sampling frequency) and number of bits per sample as will be approximate to those for the input unit of the apparatus and the same as the total number of bits of audio data for the basic apparatus. To obtain that sampling frequency, an audio sampling converter is provided between the input unit of the apparatus and audio data converter. For example, it is assumed here that a basic 60-fields/sec apparatus can record audio data in a format of 800 samples/field×24 bits/sample and a 48-fields/sec apparatus, implemented based on the 60-fields/sec apparatus as a basic apparatus, is for audio data having a sampling frequency of 48 kHz. For the 48-fields/sec apparatus, audio data includes 1000 samples per field. A simple calculation provides a format of 1000 samples/field× 19.2 bits/sample because 800 samples/field×24 bits/sample=19200 bits/field. However, since the "19.2 bits/sample" is not any integer, this data format cannot be adopted. For a solution, the number of bits/sample is made a convenient one approximate to "19.2". For example, the format is made "960 samples/field×20 bits/sample". However, this number of samples per field leads to a sampling frequency of 960 samples/field×48 fields/sec (=46080 samples/sec). To solve this problem, there is provided between the input unit and audio data converter of the apparatus a sampling rate converter for 46.08 kHz and 48 kHz for an input unit sampling rate to be 48 kHz as desired. In this case, since the audible range of sound to the human being is generally 20 kHz, the sampling rate has only to be over 40 kHz according to the theory of sampling. Also, the sampling rate of 46.08 kHz is considered to be sufficient in view of the performances of the D-A converter, A-D converter, etc. used in the apparatus.

In case there are not available any convenient number of samples per field and convenient number of bits per sample, the total number of bits may be attained which is the same as for the basic apparatus by adding a stuffing (meaningless data) to the data without using the sampling rate converter. For example, in the 48-fields/sec apparatus, a stuffing (meaningless data) of 200 bits is added to the data in a format of 1000 fields/sample×19 bits/sample to convert the format to 800 samples/field×24 bits/sample(=19200 bits/field).

In the digital audio recording apparatus according to the present invention, the format of audio data can also be converted in an ECC encoding circuit. For the audio data format conversion, only an audio clock used in the baseband processing is supplied to the ECC encoding circuit. For example, for implementing a 50-fields/sec VTR operating with an audio baseband precessing clock of 48 kHz based on a VTR taken as a basic apparatus and directed for audio data having a field frequency of 60 fields/sec and audio baseband processing clock of 48 kHz, only the clock of 48 kHz is supplied as the audio clock without input of 48 kHz×50/60(=40 kHz).

The format conversion of audio data should be done just after the audio clock is supplied to the ECC encoding circuit. For the conversion of the audio data format, as many registers as the number of bits per audio baseband sample in the basic recording apparatus and audio data is cyclically written to and read from the registers in an LSB-first or MSB-first manner. Also, at the reading side, a pause is taken for matching with a data rate at the writing side. For example, to implement an apparatus for data having a field frequency of 50 fields/sec and a format of 960 samples/field×20 bits/sample based on an apparatus taken as a basic apparatus and directed for data having a field frequency of 60 fields/sec and a format of 800 samples/field×24 bits/sample, twenty four registers (for 24 bits) are provided in the ECC encoding circuit and audio data is cyclically written with LSB first to the registers at a rate of 20 bits/sample and the audio data is read with LSB first from the registers at a rate of 24 bits/sample to convert the format of the audio data. At the reading side, a pause is taken at every six samples.

The circuit control effected after the audio data formation conversion lasts correspondingly to reading data from an audio data format conversion register. That is, correspondingly to the pause in reading the audio data from the audio data format conversion register, the internal counter for the control signal is put out of counting operation. For example, for implementing a 50-fields/sec apparatus based on a 60-fields/sec apparatus taken as a basic apparatus, reading of the audio data from the audio data conversion register is not done at every six samples. Correspondingly, the internal counter for the control signal is also put out of counting operation. Thus, the period of the control signal will be 6/5 of 60 fields/sec and hence a processing at a rate of 800 samples per field in the 60-fields/sec apparatus will be made at a rate of 960 samples per field in the 50-fields/sec apparatus.

In the digital audio playing apparatus according to the present invention, the clock for the audio processor in a block nearer from the audio data converter to a recording/playing medium is a one corresponding to a ratio in field frequency between the basic apparatus and intended apparatus. For example, when a VTR for audio data having a field frequency of 60 fields/sec and audio processing clock frequency of 48 kHz is a basic apparatus, the audio processing clock frequency of a VTR implemented, based on the basic apparatus, for audio data having a field frequency of 50 fields/sec is 48 kHz×50/60(=40 kHz).

The audio processing clock for a block nearer from the audio data converter to the output unit of the apparatus (farther from the medium) is an output clock frequency of the apparatus. For example, it is assumed that based on a 60-fields/sec apparatus for audio data having a format of 800 samples/field×24 bits/sample (with sampling frequency of 48 kHz), a 50-fields/sec apparatus is implemented to record audio data having a format of 960 samples/field×20 bits/sample (with sampling frequency of 48 kHz). In this case, the clock for a block nearer from the audio data converter to the output unit of the apparatus (farther from the medium) is 48 kHz. Thus, both the 60- and 50-fields/sec apparatuses make baseband processing of the audio data with 48 kHz and can share the same circuit.

In a block of the audio data converter nearer to the output unit of the apparatus (farther from the recording medium), audio data is processed to have such a number of samples per field and number of bits per sample that the total number of bits per field is the same as in an apparatus for audio data of the basic field frequency. For example, it is assumed that audio data has been recorded in a format of 800 samples/field×24 bits/sample by an apparatus for audio data having the basic field frequency of 60 fields/sec. In this case, an apparatus for audio data having a field frequency of 50 fields/sec will record audio data in a format of 960 samples/field×20 bits/sample. The total number of bits per bit for both the apparatuses is 19200 bits/sec. The output sampling frequency for the intended apparatus can be made the same as that in the basic apparatus by changing the number of bits per sample from that in the basic apparatus as in this example. In this example, the sampling frequency in both the apparatuses for the field frequencies of 60 and 50 fields/sec, respectively, is 48 kHz.

The number of samples per field and number of bits per sample for a block of the audio data converter nearer to the output unit of the apparatus are determined as above. When they are the same as those for the output unit of the apparatus, they can easily be determined. Depending upon an intended field frequency, however, there are not available any suitable number of samples per field and number of bits per sample in some cases. Also, for a convenience of the intended apparatus, the number of samples per field and number of bits per sample for the output unit of the apparatus should desirably be arbitrary in some cases. In such a case, there will be determined such a number of samples per field (will affect the sampling frequency) and number of bits per sample as will be approximate to those for the output unit of the apparatus and the same as the total number of bits of audio data for the basic apparatus. To obtain that sampling frequency, an audio sampling converter is provided between the output unit of the apparatus and audio data converter. For example, it is assumed here that a basic 60-fields/sec apparatus can record audio data in a format of 800 samples/field×24 bits/sample and a 48-fields/sec apparatus, implemented based on the 60-fields/sec apparatus as a basic apparatus, is for audio data having a sampling frequency of 48 kHz. For the 48-fields/sec apparatus, audio data includes 1000 samples per field. A simple calculation provides a format of 1000 samples/field× 19.2 bits/sample because 800 samples/field×24 bits/sample=19200 bits/field. However, since the "19.2 bits/sample" is not any integer, this data format cannot be adopted. For a solution, the number of bits/sample is made a convenient one approximate to "19.2". For example, the format is made "960 samples/field×20 bits/sample". For this number of samples per field, however, the sampling frequency will be 960 samples/field×48 fields/sec(=46080 samples/sec). To this end, there is provided between the output unit and audio data converter of the apparatus a 46.08/48-kHz sampling rate converter and the output unit sampling rate is 48 kHz as desired. In this case, the sampling frequency is converted to 46.08 kHz but since the audible range of sound to the human being is generally 20 kHz, the sampling rate has only to be over 40 kHz according to the theory of sampling. Also, the sampling rate of 46.08 kHz is considered to be sufficient in view of the performances of the D-A converter, A-D converter, etc. used in the apparatus.

In case there are not available any convenient number of samples per field and convenient number of bits per sample, the total number of bits may be attained which is the same as for the basic apparatus by adding a stuffing (meaningless data) to the data without using the sampling rate converter. For example, in the 48-fields/sec apparatus, a stuffing (meaningless data) of 200 bits is added to the data in a format of 1000 samples/field×19 bits/sample to convert the format to 800 samples/field×24 bits/sample(=19200 bits/field).

At the time of data encoding during data recording, the audio data for the intended apparatus is converted by the audio data converter into a one having the same number of samples/field and number of bits/sample as those in the baseband of the basic apparatus while changing the sampling rate at the field frequency ratio between the intended and basic apparatuses. Specifically, FIFO can be used for this data conversion and also for the sampling frequency conversion. For example, it is assumed here that the basic apparatus is for audio data having a field frequency of 60 fields/sec and a format of 800 samples/field×24 bits/sample and an intended apparatus implemented based on the basic apparatus records audio data having a field frequency of 50 fields/sec in a format of 960 samples/field×20 bits/sample. In the 50-fields/sec apparatus, six samples are processed as one unit, six samples× 20 bits/sample (with sampling frequency of 48 kHz) are written to FIFO of the audio data converter, and the five samples× 24 bits/sample are subject to data rearrangement in FIFO to read audio data with 40 kHz(=48 kHz×50/60). Thus, the audio data converter can converts 960 samples/field×20 bits/sample (with sampling frequency of 48 kHz) into 800 samples/field×24 bits/sample (with sampling frequency of 40 kHz).

For encoding during data recording, audio data for an intended apparatus is converted by the audio data converter to have the same number of fields per field and number of bits per sample as those for baseband processing in an apparatus accommodating the basic field frequency and simultaneously the sampling rate is multiplied by a ratio in field frequency between both the apparatuses. More specifically, FIFO can be used for the data conversion and also the sampling frequency is converted by the FIFO. For example, it is assumed that the basic apparatus deals with a field frequency of 60 fields/sec and reproduces audio data having a format of 800 samples/field×24 bis/sample and a 50-fields/sec apparatus is implemented, based on the basic apparatus, to record the audio data in a format of 960 samples/field×20 bits/sample. In this case, the recording medium has recorded therein the audio data whose format of 6 samples×20 bits/sample (with sampling frequency of 48 kHz) has been converted to 5 samples×24 bits/sample (with sampling frequency of 40 kHz). The audio data including 5 samples×24 bits/sample (with sampling frequency of 40 kHz), read from the medium, is written to FIFO in the audio data converter with 40 kHz. In FIFO, the audio data is rearranged in the format of 6 samples×20 bits/sample and read with a sampling frequency of 48 kHz. Thus, the audio data converter can convert the format of 800 samples/field×24 bits/sample (with sampling frequency of 40 kHz) into 960 samples/field×20 bits/sample (with sampling frequency of 48 kHz).

The sequence of the audio data conversion starts with the first sample in the beginning of the field. In the above example, for example, the 6 samples×20 bits/sample from the first sample in the beginning of the field at the time of encoding is converted to 5 samples×24 bits/sample, while the 5 samples×24 bits/sample from the first sample in the beginning of the field at the time of decoding is converted to 6 samples×20 bits/sample.

The audio recording format on the medium is made the same as in the basic apparatus, and also the error-corrective processing is made the same as in the basic apparatus. In case the basic 60-fields/sec apparatus is for audio data of 800 samples/field×24 bits/sample and a 50-fields/sec apparatus implemented based on the basic apparatus is to record the audio data in a format of 960 samples/field×20 bits/sample, the audio data is converted in format from 960 samples/field×20 bits/sample into 800 samples/field×24 bits/sample. The audio data thus converted has the same number of samples per field and the same number of bits per sample as those in the basic apparatus, and the same error-corrective processing as in the basic apparatus is effected on the audio data to record the audio data in the same audio recording format as in the basic apparatus.

In the digital audio recording apparatus according to the present invention, the format of audio data can also be converted in an ECC decoding circuit. For the audio data format conversion, only an audio clock used in the baseband processing is supplied to the ECC decoding circuit. For example, for implementing a 50-fields/sec VTR operating with an audio baseband precessing clock frequency of 48 kHz based on a VTR taken as a basic apparatus and directed for audio data having a field frequency of 60 fields/sec and audio baseband processing clock frequency of 48 kHz, only the clock of 48 kHz is supplied as the audio clock without input of 48 kHz×50/60(=40 kHz).

The format conversion of audio data should be done just before the audio clock is outputted from the ECC decoding circuit. For the conversion of the audio data format, as many registers as the number of bits per audio baseband sample in the basic playing apparatus and audio data is cyclically written to and read from the registers in an LSB-first or MSB-first manner. Also, at the writing side, a pause is taken appropriately in writing for matching with a data rate at the reading side. For example, to implement a 50-fields/sec apparatus for data a format of 960 samples/field×20 bits/sample based on a 60-fields/sec apparatus taken as a basic apparatus and directed for data having a format of 800 samples/field×24 bits/sample, twenty four registers (for 24 bits) are provided in the ECC decoding circuit and audio data is cyclically written with LSB first to the registers at a rate of 24 bits/sample and the audio data is read with LSB first from the registers at a rate of 20 bits/sample to convert the format of the audio data. At the writing side, a pause is taken at every six samples.

The circuit control effected before the audio data formation conversion lasts correspondingly to a pause in writing the audio data to an audio data format conversion register. That is, correspondingly to the pause in writing the audio data to the audio data format conversion register, the internal counter for the control signal is put out of counting operation. For example, for implementing a 50-fields/sec apparatus based on a 60-fields apparatus as a basic apparatus, writing the audio data to the audio data conversion register is not done at every six samples. Correspondingly, the internal counter for the control signal is also put out of counting operation. Thus, the period of the control signal will be 6/5 of 60 fields/sec and hence a processing at a rate of 800 samples per field in the 60-fields/sec apparatus will be made at a rate of 960 samples per field in the 50-fields/sec apparatus.

Audio data is read from or written to the format conversion register with LSB or MSB first whichever is automatically selected depending upon whether the forward or reverse play is to be done. Since the arriving order of the audio data intended for the forward play is opposite to that of the audio data for the reverse play, the format conversion is made with MSB first or LSB first depending upon the play is made forward or reverse. Thus, it is necessary to appropriately control the format conversion for the MSB first mode or LSB first mode depending upon whether the audio data is reproduced forward or reverse.

In the shuttle play, audio data including data of different fields mixed when the audio data undergoes the format conversion is reproduced but since each of the first and last data packs in the sequence of audio data conversion should include all data for one original sample, only format-convertible data included in the original data is reproduced as invalid data. The data other than the first and last data in the sequence of audio data conversion cannot completely be converted in format and a mixture of different sample data is converted. The sample data is taken as an error and concealed at the later stage of operation. It should be noted that since valid audio data format-converted samples are formed in addition to the first and last data in the sequence of audio data conversion by limiting the number of high-order valid data bits, more data than above can be used as valid data for shuttle-play sound. In this case, however, LSBs lower than the limited bits are replaced with 0 data.

In the digital video recording apparatus according to the present invention, the video frame of an input signal having an object field frequency is converted by the converter to be the same as the frame in the basic apparatus and also the clock is converted by multiplying it by the field frequency ratio between the object and basic apparatuses. For example, it is assumed here that the basic apparatus accommodates video data having a field frequency of 60 fields/sec and a format of 2200 samples/line×1125 lines/field (with effective area of 1920 samples×1080 lines and clock of 74.25 MHz) and the intended apparatus accommodates video data having a field frequency of 50 fields/sec and a format of 2640 samples/line×1125 lines/field (with effective area of 1920 samples×1080 lines and clock of 74.25 MHz). In this case, the format of 2640 samples/line×1125 lines/field (with effective area of 1920 samples×1080 lines and clock of 74.25 MHz) is converted to the format of 2200 samples/line×1125 lines/field (with effective area of 1920 samples×1080 lines and clock of 61.875 MHz(=74.25 MHz×50/60)).

In the circuit provided downstream of the converter, the video encoding including video compression, error-corrective encoding, etc. in the intended apparatus is quite the same as that in the basic apparatus except for a clock multiplied by the field frequency ratio between the basic and intended apparatuses. For example, when the basic apparatus accommodates video data having a field frequency of 60 fields/sec and a video compression output clock of 46.4 MHz and the intended apparatus accommodates a field frequency of 50 fields/sec, the intended apparatus will do the same as the basic apparatus with a video compression output clock of 46.4 MHz×50/60(=38.6666 MHz).

On the other hand, down to the video decoding clock converter of the digital video playing apparatus, the video decoding including the error-corrective decoding, video expansion, etc. is quite the same as that in the basic apparatus with a clock multiplied by the field frequency ratio between the basic and intended apparatuses. For example, when the basic apparatus accommodates video data having a field frequency of 60 fields/sec and a video expansion input clock of 46.4 MHz and the intended apparatus accommodates a field frequency of 50 fields/sec, the intended apparatus will do the same as the basic apparatus with a video expansion input clock of 46.4 MHz×50/60(=38.6666 MHz).

In the video decoding clock converter, the video frame of an output signal of the object field frequency is converted into a desired frame and also the clock is converted into a desired one. For example, it is assumed here that the basic apparatus accommodates video data having a field frequency of 60 fields/sec and a format of 2200 samples/line×1125 lines/field (with effective area of 1920 samples×1080 lines and clock of 74.25 MHz) and the output from the intended apparatus has a field frequency of 50 fields/sec and a format of 2640 samples/line×1125 lines/field (with effective area of 1920 samples×1080 lines and clock of 74.25 MHz). In this case, since at the input side of the video decoding clock converter, the same frame and clock as those in the basic apparatus are ones multiplied by the field frequency ratio between the basic and intended apparatuses, the format of data for the basic apparatus is 2200 samples/line×1125 lines/field (with effective area of 1920 samples×1080 lines and clock of 61.875 MHz (=74.25 MHz×50/60)) and this is converted to the format of 2640 samples/line×1125 lines/field (with effective area of 1920 samples×1080 lines and clock of 74.25 MHz) for the intended apparatus.

In case the number of video lines and effective frame vary between standards (SD) or the like as well as field frequencies, the recorder section has provided in the encoding system of the intended apparatus a converter having a video line convert filter and which makes the number of video line and effective frame the same as those in the basic apparatus and coverts the clock by multiplying it by the ratio in field frequency between the basic and intended apparatuses. For example, it is assumed here that one of the basic and intended apparatuses accommodates video data having a field frequency of 60 fields/sec and a format of 720 samples×480 lines (13.5 MHz) and the other accommodates video data having a field frequency of 50 fields/sec and a format of 720 samples×576 lines (13.5 MHz), thus these video data being different in frame and clock from each other. In this case, the data of 50 fields/sec and 720 samples×576 lines is line-converted by filtering into 60 fields/sec and 720 samples×480 lines and the clock frequency is converted into 13.5 MHz×50/60(=11.25 MHz).

In case the number of video lines and effective frame vary between standards (SD) or the like as well as field frequencies, the player section has provided in the decoding system of the intended apparatus a converter having a video line convert filter and which converts a video signal whose video frame and clock are multiplied by the field frequency ratio between the basic and intended apparatuses into a one having a desired video frame clock frequency. For example, it is assumed here that the basic apparatus accommodates video data having a field frequency of 60 fields/sec and a format of 720 samples×480 lines (13.5 MHz) and the other accommodates video data having a field frequency of 50 fields/sec and a format of 720 samples×576 lines (13.5 MHz). In this case, the video frame at the input side of the converter with the video line convert filter has the same clock as for the basic apparatus and the clock multiplied by the field frequency ratio between the basic and intended apparatuses. So, the video data for the intended apparatus has a format of 720 samples× 480 lines (with clock of 11.25 MHz (=13.5 MHz×50/60)). This is converted by the converter with the video line convert filter into the format of 720 samples×576 lines (with clock frequency of 13.5 MHz.

BRIEF DESCRIPTION OF THE DRAWINGS

FIGS. 4A and 4B show a format of audio data.

FIGS. 5A and 5B are block diagrams showing together a first embodiment of the digital audio/video recorder/player according to the present invention.

FIGS. 6A, 6B and 6C explain together the operations of the digital audio/video recorder/player shown in FIGS. 5A and 5B.

FIGS. 7A and 7B explain together the operations of an audio data packing unit included in the digital audio/video recorder/player shown in FIGS. 5A and 5B.

FIGS. 9A and 9B are block diagrams showing together a second embodiment of the digital audio/video recorder/player according to the present invention.

FIGS. 11A and 11B are block diagrams showing together another example of the basic digital audio/video recorder/player FIGS. 12A and 12B are block diagrams showing together a third embodiment of the digital audio/video recorder/player according to the present invention.

FIGS. 13A, 13B and 13C explain together the operations of the digital audio/video recorder/player shown in FIGS. 12A and 12B.

FIGS. 14A and 14B are block diagrams showing together a fifth embodiment of the digital audio/video recorder/player according-to the present invention.

FIGS. 20A and 20B explain the operations of the convert register included in the ECC decoder and audio/video separator included shown in FIG. 19.

BEST MODE FOR CARRYING OUT THE INVENTION

As previously mentioned, the present invention is directed to a simplified recording/playing apparatus for audio and video data of a field frequency, implemented, based on an existing recording/playing apparatus taken as a basic apparatus and directed for audio data and video data of a different field frequency, to record or reproduce audio and vide data originated from the basic apparatus . In the following explanation, a VTR (video tape recorder) will be taken as an example of such an audio/video recorder/player, and hence the audio/video recorder/player will be referred to simply as "VTR". However, it should be noted that the present invention is not limited to the VTR. The VTR incorporates a CPU (central processing unit) which executes a computer program to carry out an audio recording method, audio playing method, video recording method and a video playing method, each including a predetermined sequence of operations. The computer program is stored in a ROM (read-only memory), hard disc or any other recording medium and installed into the VTR. The CPU in the VTR will read the computer program from such a medium and execute it.

Figures 1A, 1B:
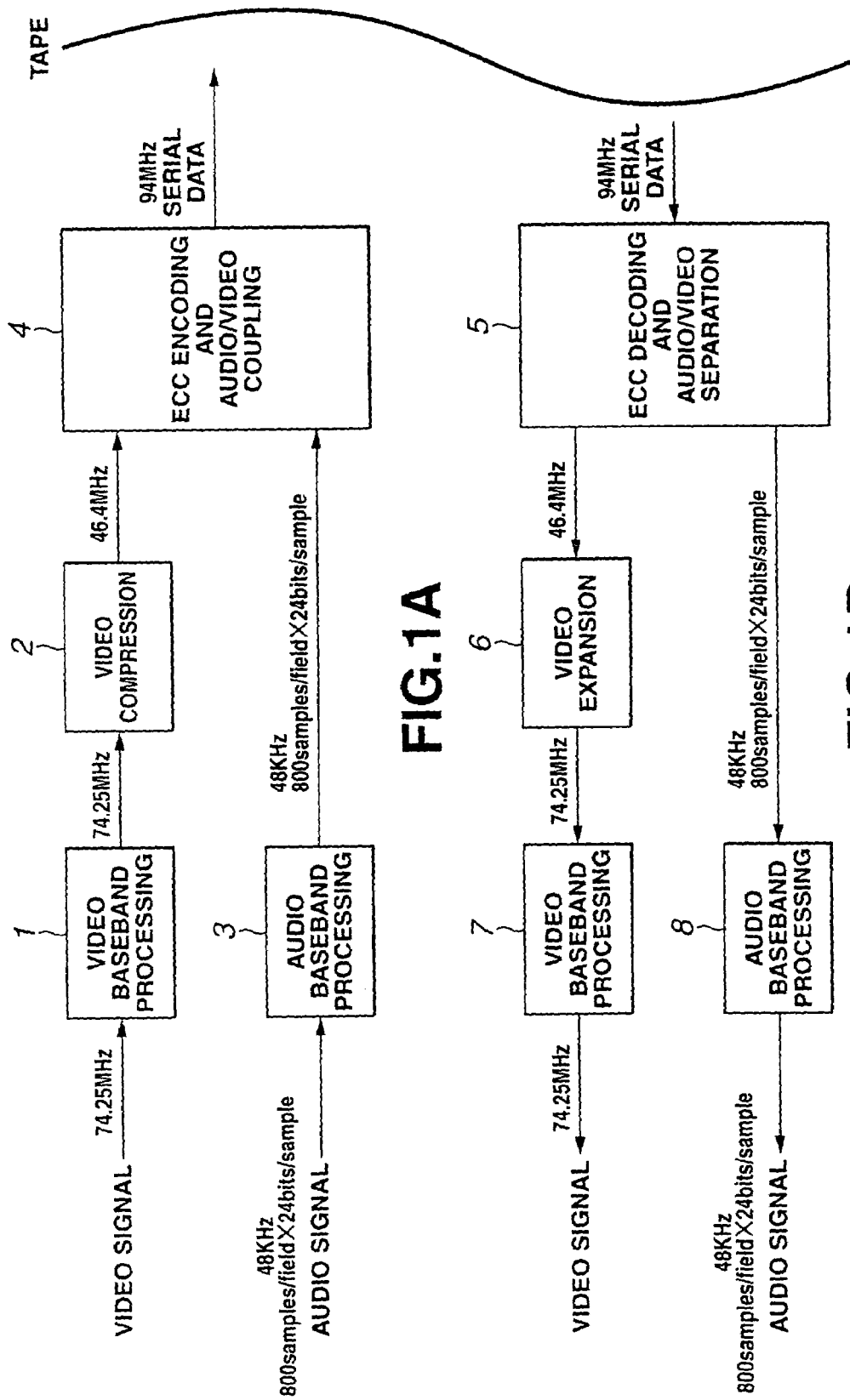
FIGS. 1A and 1B are block diagrams showing together an example of the basic digital audio recorder/player.

FIGS. 1A and 1B are block diagrams, respectively, showing a VTR capable of supporting a field frequency of 60 fields/sec. The VTR is the "basic apparatus" referred to herein. FIG. 1A shows the recorder section of the VTR and FIG. 1B shows the player section. An input video signal is supplied to a video baseband processor 1 which operates with a clock of 74.25 MHz. The video baseband processor 1 processes a brightness component, chroma component, etc. of the input video signal. The video signal thus processed by the video baseband processor 1 is sent to a video compressor 2 where the video signal will be compressed and carried on a clock of 46.4 MHz to an ECC encoder and audio/video coupler 4.

On the other hand, the input audio signal to the VTR has a sampling frequency of 48 kHz. The number of samples per field is 48000/60=800. One sample is of 24 bits. The input audio signal is sent to an audio baseband processor 3 where it will undergo an audio baseband processing. For example, the audio baseband processor 3 controls the gain etc. of the audio signal. The audio signal thus processed by the audio baseband processor 3 is sent to the ECC encoder and audio/video coupler 4 which will process the audio and video signals compliance with a VTR tape format by generating an error correction code (ECC) for each of the audio and video signals and adding parities C1 and C2 to the ECC codes thus generated, respectively. The input clocks of the ECC encoder and audio/video coupler 4 operates with a clock of 46.4 MHz for the video signal and a clock of 48 kHz for the audio signal to output a serial data of 94 MHz for tape recording.

Figure 2:
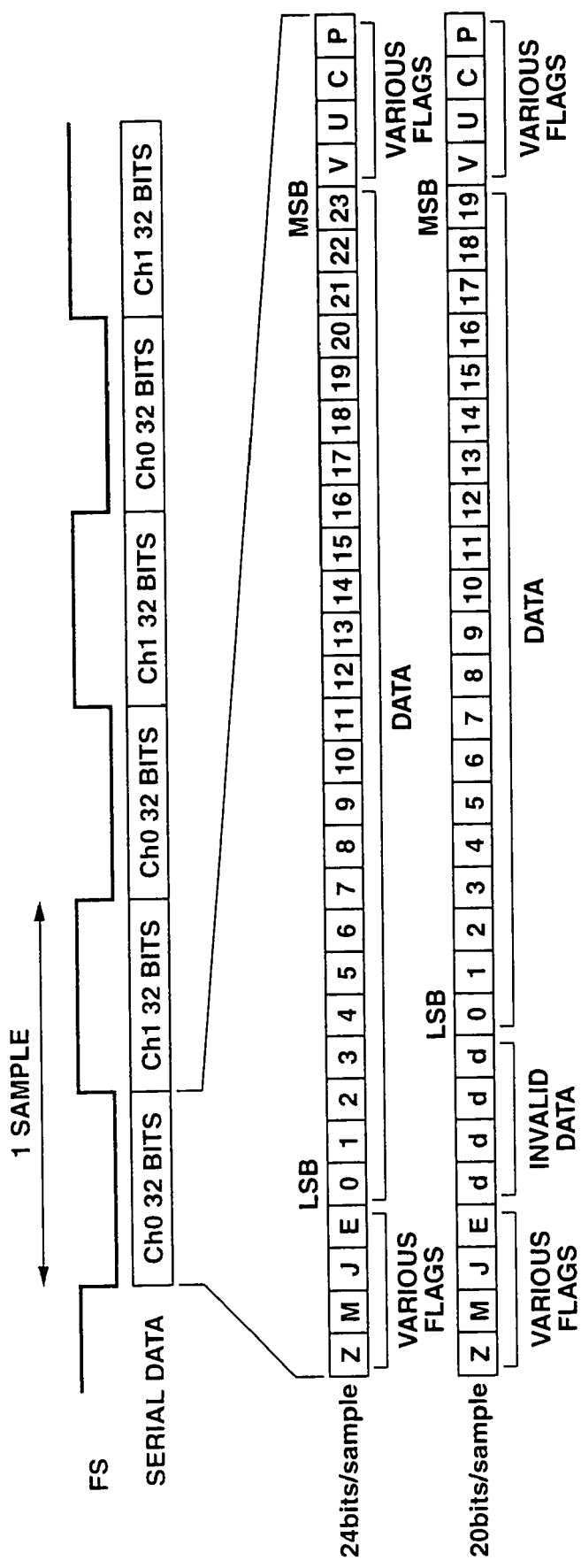
FIG. 2 schematically illustrates audio data serially supplied to the basic digital audio recorder/player in FIGS. 1A and 1B.

As above, the audio input data to the ECC encoder and audio/video coupler 4 is a serial one and supplied at a rate of 64 bits/sample. FIG. 2 shows a format of the audio serial data. As will be seen, the serial data is supplied in a mixed 2-channel AES/EBU form. In FIG. 2, Z, M, J, E, V, U, C and P are flags. The main data is supplied with LSB first. FIG. 2 shows data formats of 24 bits/sample and 20 bits/sample, respectively. Thus, the audio data to the ECC encoder and audio/video coupler 4 is a serial data. In FIGS. 1A and 1B, "48 kHz" means a rate of 48 kHz when one sample is counted as one clock, namely, it is a sampling frequency. Since the audio input to the ECC encoder and audio/video coupler 4 is a serial data, so the clock frequency of the serial data will be represented by 48 kHz×64 bits/sample=3.072 MHz. For the audio data, however, the sampling frequency in which one sample is taken as one unit is important. One sample is supplied as a series of 64 bits in this example, but it will be supplied as a series of 256 bits as the case may be. Therefore, only "48 kHz" which is thus important is shown in FIGS. 1A and 1B, and the audio clock will be indicated with the sampling frequency hereafter.

The signal output from the ECC encoder and audio/video coupler 4 will be recorded to a tape. A signal read from the tape is supplied to an ECC decoder and audio/video separator 5. After separating the signal read from the tape into audio and video data, the ECC decoder and audio/video separator 5 will make error-corrective decoding of the ECC code. The video data is supplied synchronously with a clock of 46.4 MHz to a video expander 6 where it will be decompressed or expanded to provide a video baseband signal. The video baseband signal is sent to a video baseband processor 7. The brightness component, chroma component, etc. of the video baseband signal, are processed by the video baseband processor 7 and the video baseband signal thus processed is provided as an output from the VTR. On the other hand, the audio signal undergo an error correction in the ECC decoder and audio/video separator 5 and is provided as an audio baseband signal from the ECC decoder and audio/video separator 5. The audio signal output from the ECC decoder and audio/video separator 5 includes 800 samples per field and 24 bits per sample. The audio signal is sent at a sample frequency of 48 kHz to an audio baseband processor 8 where it will undergo gain control and other processing. This signal is an output audio signal from the VTR.

Figures 3A, 3B:
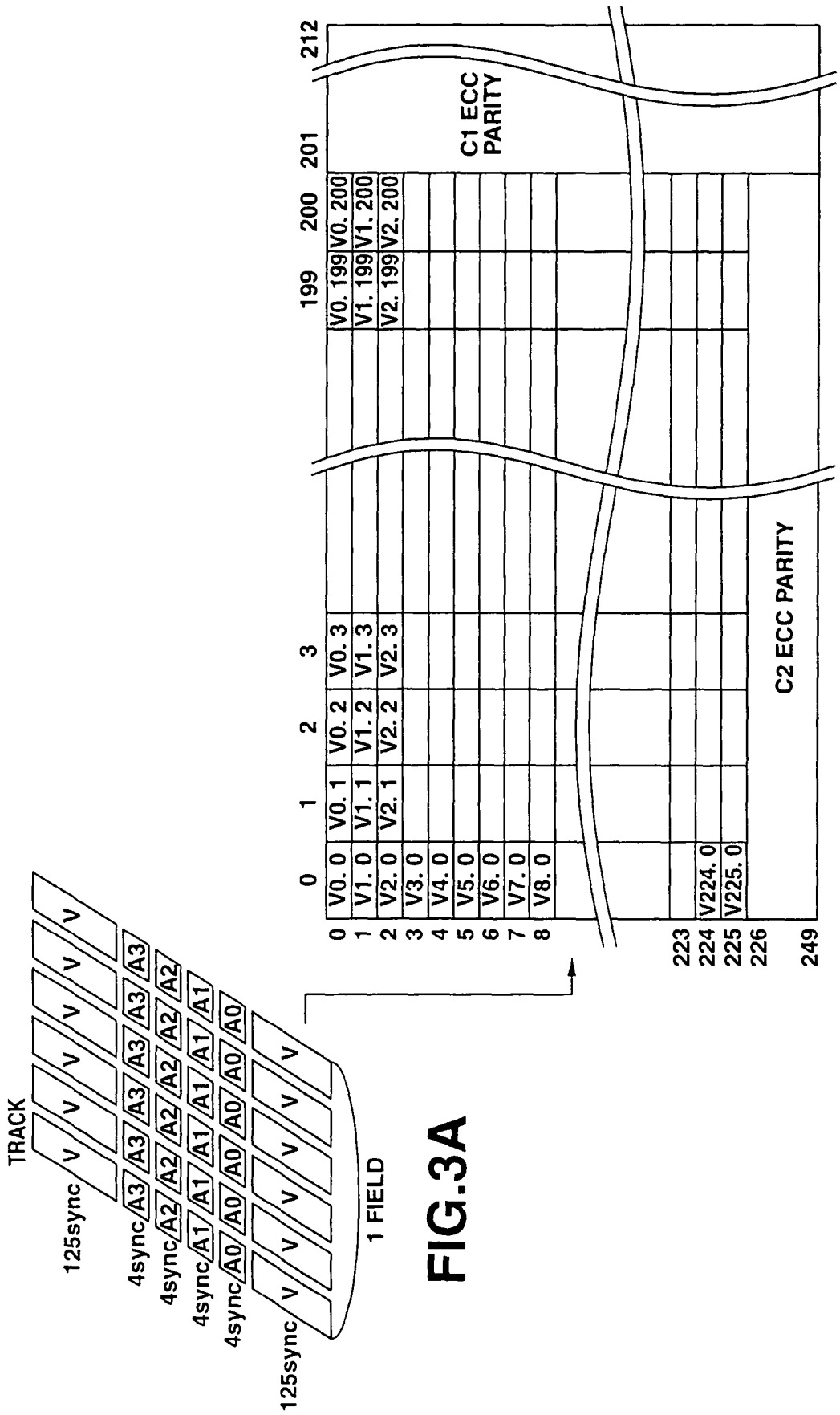
FIGS. 3A and 3B show a format of video data.

FIG. 3A shows a format in which video recording is done at a field frequency of 60 fields/sec. One field is composed of six tracks each forming one ECC (error correction code) block (product code). Because one field includes six tracks, video data has 6 ECC blocks per field. In FIG. 3A, the "V" in the tape footprint indicates "video" and one video is divided in two sectors per track. One ECC block of the video is of 250 syncs per track, namely, 125 syncs per sector. That is, one track includes 250-sync data. This ECC block is constructed as shown in FIG. 3B. One sync means one C1-directional data in the ECC block. The 1C ECC parity is of 12 bytes while the C2 ECC parity is of 24 bytes. Video data is compressed one.

FIGS. 4A and 4B show together a recording format for audio data having the field frequency of 60 fields/sec. The "A0" in the tape footprint shown in FIG. 4A indicates an audio channel 0, "A1" indicates an audio channel 1, "A2"

indicates an audio channel 2, and "A33" indicates an audio channel 3. The audio ECC block includes one field per audio channel. The audio is recorded at a rate of 4 syncs/audio channel. Therefore, data on six channels for one field will totally be 4 syncs/track•channel×6 tracks/field=24 syncs/field•channel. The audio ECC block is constructed as shown in FIG. 4B. Twelve bytes are allocated to the C1 ECC parity and also 12 bytes are allocated to the C2 ECC parity. Since one audio sample is of 24 bits, so this number of bits is divided into 8 bits×3 symbols. As shown in FIG. 4B, one sample is constructed to be put as a 3-bit data into one sync with MSB first. Since one field includes 800-sample data, so a data frame for four samples is excessive in the ECC block but user data is allocated to the data frame. Non-compressed data is put in the audio sample data.

FIGS. 5A and 5B are block diagrams showing together a 50-fields/sec VTR. FIG. 5A shows the recorder section and FIG. 5B shows the player section. This VTR is constructed to accommodate data originated from the 60-fields/sec VTR shown in FIGS. 1A and 1B. This 50-fields/sec VTR uses blocks including a video compressor 2, audio baseband processor 3, ECC encoder and audio/video coupler 4, ECC decoder and audio/video separator 5, video expander 6 and an audio baseband processor 8, all of which are the same as those used in the 60-fields/sec VTR. A video baseband processor 1' and video baseband processor 7' are provided for video encoding and decoding, respectively, with a clock frequency of 74.25 MHz which is the same clock as for the 60-fields/sec video baseband processor 1 and video baseband processor 7 and almost the same processing as by the latter. Therefore, there is little actual difference in circuit between the video baseband processor processors 1' and 1 and the video baseband processors 7' and 7, respectively.

The recorder section of this VTR includes a video clock converter 11 which is supplied with an input sampled with 74.25 MHz and provides an output of 61.875 MHz(=50/60 in field frequency ratio×74.25 MHz). This example is of a "Hi-Vision" type. Whether the field frequency is 50 Hz or 60 Hz, the effective frame area is of 1920 samples×1080 lines (or 1440 samples×1080 lines). That is, since there is no difference in effective frame between the cases of 50 and 60 Hz, so the output of 61.875 MHz being 50/60 of the input can be obtained just by discarding the ineffective frame area and the entire effective frame area can be valid data as it is.

FIGS. 6A, 6B and 6C show differences among frames of different field frequencies in different processing steps. FIG. 6A shows a frame whose field frequency is 60 Hz, FIG. 6B shows a frame whose field frequency is 50 Hz, and FIG. 6C shows a frame (signal form) resulted from processing of the 50-Hz frame by the video clock converter 11. The signal form (as in FIG. 6C) after processed by the video clock converter 11 is quite the same, including the ineffective frame area, as the signal form (as in FIG. 6A) of which the field frequency is 60 fields/sec and sampling frequency is 74.25 MHz.

The 61.875-MHz signal output from the video clock converter 11 is sent to the video compressor 2. Under the assumption that the output clock is 38.666 MHz which is 50/60 of 46.4 MHz, the clock and data rate for the video compressor 2 are just 50/60 of the corresponding basic clock and data rate, respectively, and necessary operations are quite the same as in the 60-fields/sec VTR which is the base of this 50-fields/sec VTR. In other words, the video clock converter 11 plays a role in causing the system components provided downstream thereof to make quite the same operations as in the 60-fields/sec VTR at the rate of 50/60 in the latter VTR.

In the audio system, an audio data packing unit 9 is provided which functions the same way as the video clock converter 11. As shown in FIG. 5A, the audio data packing unit 9 converts data whose sampling frequency is 48 kHz and format is 960 samples/field×20 bits/sample(=19200 bits/field) into a data whose sampling frequency is 40 kHz and format is 800 samples/field×24 bits/sample(=19200 bits/field). Since both these audio data have the same total number of bits per field (=19200 bits/field), so they can be converted into each other. It should be noted here that since 40 kHz =48 kHz×50/60, so the components provided downstream of the audio data packing unit 9 can also function in the same manner as in the 60-fields/sec VTR at the rate of 50/60 in the latter VTR.

FIG. 7A shows the audio data packing unit 9 in detail. As shown in FIG. 7A, the audio data packing unit 9 includes an FIFO and FIFO controller. In the 48-kHz system, one sequence of the data pack includes 6 samples (each including 20 bits). Namely, 20 bits/sample×6 samples=120 bits. This sequence of data is converted in the 40-kHz system into a data sequence of 120 bits(=24 bits/sample×5 samples). The audio data packing unit 9 has serially been supplied with audio data and the data is serially written bit by bit into the FIFO at a frequency of 64×48 kHz in the 48-kHz system. At this time, flags Z, M, J, E, V, U, C and P are not written into the FIFO but solely the data is written into the FIFO. The written data is serially read bit by bit from the FIFO at a frequency of 64×40 kHz in the 40-kHz system. However, the flags are not read from the FIFO but "0" is put in place of each flag (the flags are meaningless data in the latter downstream section of the system. Data is read at a rate of 24 bits/sample and sent to the ECC encoder and audio/video coupler 4. As shown in FIG. 7B, one sequence starts at the top of a field. For this sequence starting, a signal FIELD-START indicative of a field top is supplied to the audio data packing unit 9. FIG. 7B shows how data is written to and read from the FIFO of the audio data packing unit 9. The FIFO is shown divided in 4-bit blocks for easier understanding of how data of 20 bits are converted into data of 24 bits. Actually, data is written and read bit by bit as mentioned above. For conversion of the 48-kHz system into 40-kHz system, the FIFO controller provides a control signal FIELD-START, namely, information indicating where the field top is in the converted data in the 40-kHz system. According to the control signal FIELD-START, the ECC encoder and audio/video coupler 4 cuts audio data by punctuating it at each discontinuity between the fields in the data to define an ECC block.

The video and audio inputs to the ECC encoder and audio/video coupler 4 shown in FIG. 5A have a sampling frequency and format which are 50/60 of those in the 60-fields/sec VTR. Since the output from the ECC encoder and audio/video coupler 4 is also 50/60 of that in the 60 fields/sec-VTR, so the ECC encoder and audio/video coupler 4 can operate quite the same way as in the 60-fields/sec VTR at the rate of 50/60 of that in the latter VTR. Of course, the circuits in the 60-fields/sec VTR can be quite the same as those in the 50-fields/sec VTR. In the 50-fields/sec VTR, data is recorded at the rate of 50/60 of that in the 50-fields/sec VTR. At this time, the tape travel speed, drum rotation speed, etc. are all 50/60 (field frequency ratio) of those in the 60-fields/sec VTR. Therefore, there is no different in footprint between the 60- and 50-fields/sec VTRs.

On the other hand, when reading audio and video data from a tape, the ECC decoder and audio/video separator 5 is supplied with data (50/60 of that in the 60-fields/sec VTR which is the base of the 50-fields/sec VTR). Therefore, the 50-fields/sec VTR will output both video and audio data at the rate of 50/60 of that in the 60-fields/sec VTR. Since the ECC decoder and audio/video separator 5 works quite the same way as that in the 60-fields/sec VTR except for the data rate (50/60 of that in the 60-fields/sec VTR), so the ECC decoder and audio/ video separator in the 60-fields/sec VTR can be used commonly between the 50- and 60-fields/sec VTRs. The output from the ECC decoder and audio/video separator 5 is supplied to the video expander 6. Both input to and output from the video expander 6 are made at the rate of 50/60 of that in the 60-fields/sec VTR. Naturally, the circuit of the video expander 6 in the 50-fields/sec VTR is quite the same as that in the 60-fields/sec VTR. The video clock converter 12 in the player section works reversely to the video clock converter 11 in the recorder section. The video clock converter 12 converts an input signal of 61.875 MHz which is 50/60 of the signal in the 60-fields/sec VTR back into a signal of 74.25 MHz. As will be seen in FIGS. 6B and 6C, the signal has the effective area thereof not changed but the ineffective area (blanking area) thereof changed to 74.25 MHz. There is provided a video baseband processor 7' which makes a video baseband processing of the input signal adjust the brightness component, chroma component, etc. of the latter. The video baseband processor 7' provides a signal having a field frequency of 50 fields/sec as a VTR output.

Figure 8A:
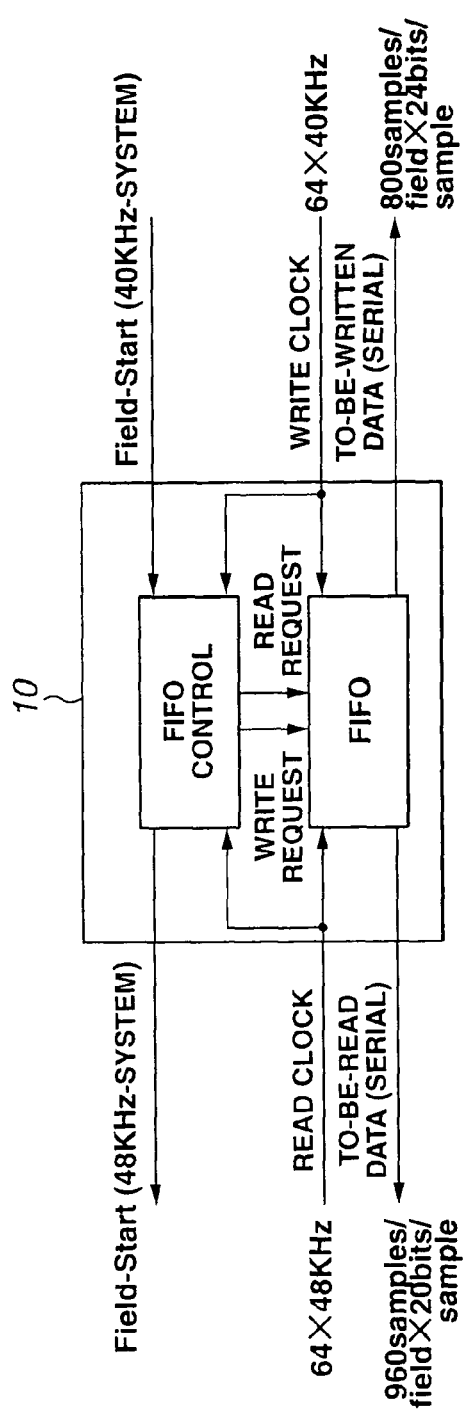
FIGS. 8A and 8B explain together the operations of an audio data depacking unit included in the embodiments of digital audio/video recorder/player shown in FIGS. 5A and 5B.
Figure 8B:
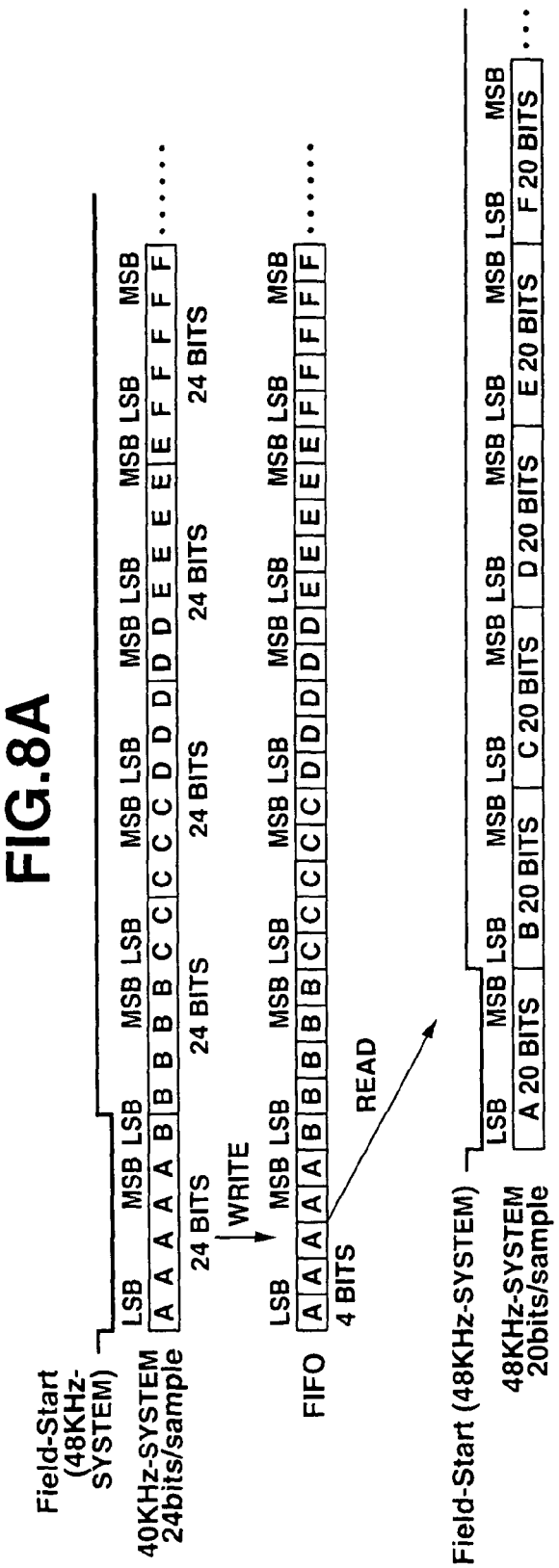

On the other hand, the audio data undergoes error correction and is then packed to be data of 40 kHz and 800 samples/field×24 bits/sample in the ECC decoder and audio/video separator 5, and it is supplied to the audio data depacking unit 10. The audio data depacking unit 10 works reversely to the audio data packing unit 9 to depack the data for converting it back into data of 48 kHz and 960 samples/field×20 bits/sample. The audio data depacking unit 10 is illustrated in detail in FIGS. 8A and 8B. As shown in FIG. 8A, even the video data has been converted from 40 kHz to 48 kHz by the FIFO controller as in the audio data packing unit 9, the FIELD-START signal indicative of a field top will correctly be transmitted. The FIELD-START signal in the recording section indicates the start point of a data unpack sequence. It is a very important signal. As in the audio data packing unit 9, one sequence is 5 samples×24 bits/sample=120 bits in the 40-kHz system (recorder section) while being 6 samples×20 bits=120 bits in the 48-kHz system (player section). Also in the audio data depacking unit 10, the FIELD-START signal indicates the start point of a data unpack sequence.

The audio data of 48 kHz and 960 samples/field×20 bits/sample processed by the audio data depacking unit 10 is supplied to the audio baseband processor 8 where it will undergo an audio baseband processing such as gain control etc. The audio data thus processed is supplied as data of 50 fields/sec in field frequency, 48 kHz in sampling frequency and 960 samples/field×20 bits/sample in format. Thus, the 50-fields/sec VTR is constructed to accommodate data originated from the 60-fields/sec VTR.

In the foregoing, the present invention has been described concerning the data having the field frequency of 50 fields/sec. However, the present invention is applicable to data having any other field frequency. FIGS. 9A and 9B are block diagrams, respectively, showing together a VTR for data of 48 fields/sec in field frequency. FIG. 9A shows the recorder section of the VTR and FIG. 9B shows the player section. The base apparatus for this VTR is the 60-fields/sec VTR having been described with reference to FIGS. 1A and 1B. The video system of this VTR includes a video clock converter 11 and video clock converter 12, which work together to convert the data rate by multiplying it by a field frequency ratio as in the 50-fields/sec VTR. In this case, the data rate conversion is made between 74.25 MHz and 59.4 MHz(=74.25 MHz×48/60).

Figure 10A:
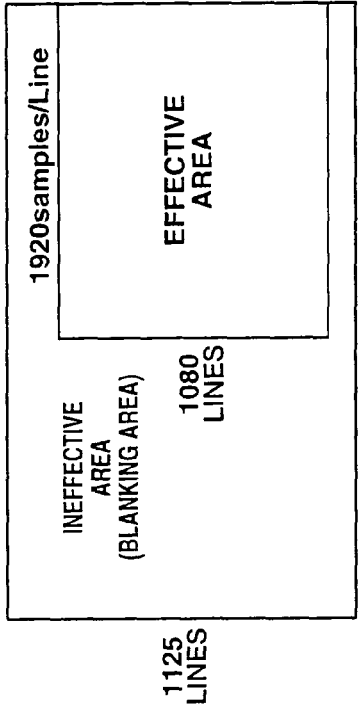
FIGS. 10A, 10B and 10C explain together the operations of the digital audio/video recorder/player shown in FIGS. 9A and 9B.
Figure 10B:
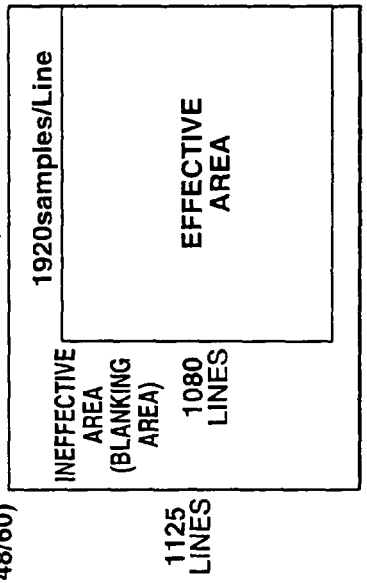
Figure 10C:
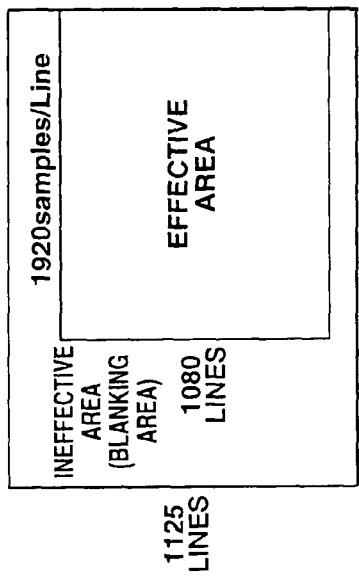

The data rate conversion is shown in FIGS. 10A, 10B and 10C. FIG. 10A shows a frame of 60 Hz in field frequency, FIG. 10B shows a frame of 48 Hz in field frequency, and FIG. 10C shows a frame (signal form) resulted from processing of the 48-Hz frame by the video clock converter 11. As will be seen from FIGS. 10A, 10B and 10C, the effective area will remain unchanged even after the conversion by the input video clock converter 11 and output video clock converter 12 as in the aforementioned 50-fields/sec VTR, only the ineffective area (blanking area) is changed, and thus the frame including the ineffective and effective areas is quite the same as that in the 60-fields/sec VTR after the conversion.

On the other hand, audio data is to be processed to have a total number of bits per field, which is the same as that in the 60-fields/sec VTR which is the base of this 48-fields/sec VTR. However, the field frequency of 48 fields/sec provides no convenient number of samples per field and number of bits per sample. In the 60-fields/sec VTR being the base for the 48-fields/sec VTR, audio data can be recorded in the format of 800 samples/field×24 bits/sample. Taking this fact in consideration, audio input has to be processed in the 48-fields/sec VTR to have a field frequency of 48 kHz. The 48 fields/sec leads to 1000 samples/field. The format of 800 samples/field× 24 bits/sample can simply be converted to 19200 bits per field. The latter is also 1000 samples/field×19.2 bits/sample. However, since the number of 19.2 bits per sample is not any integral number, so a complete completion cannot be attained. For a solution to this problem, a format of 960 samples/field×20 bits/sample, which approximate to the format of 1000 samples/field×19.2 bits/sample, is first converted to the format of 800 samples/field×24 bits/sample. That is, as shown in FIG. 9A, the format of 1000 samples/field×20 bits/sample (48 kHz and 48 fields) is once converted by an audio rate converter 13 into a format of 960 samples/field×20 bits/sample(=46.08 kHz and 48 fields/sec). Then, the signal thus obtained is converted by the audio data packing unit 9 into a format of 800 samples/field×24 bits/sample (36.864 kHz=46.08 kHz×48/60 and 48 fields/sec). The resultant signal is encoded at the field frequency-ratio rate as in the 50-fields/sec VTR.

The decoding is an inversion of the encoding. The audio data depacking unit 10 converts the format of 800 samples/field×24 bits/sample (36.864 and 48 fields/sec) into a format of 960 samples/field×20 bits/sample (46.08 kHz and 48 fields), and then an audio rate converter 14 converts the latter format into a format of 1000 samples/field×20 bits/sample (48 kHz and 48 fields/sec) which is a VTR output. At this time, the sampling rate is converted into a 46.08 kHz. However, since the sound range audible to the human ears is generally 20 kHz, so the sampling frequency may be a one above 40 kHz even when the sampling theorem is applied and thus the sampling frequency of 46.08 kHz is sufficient even when the performances of the D-A converter, A-D converter, etc. are taken in consideration. Thus, even when there is not available any integral total number of bits per field in case it is simply assumed that the total number of bits per sample in a VTR should be the same as that in a basic VTR, a sampling rate converter can be used to assure an integral total number of bits per sample without lowering the sampling frequency so much.

In the 48-fields/sec VTR, the data format may be converted into 800 samples/field×24 bits/sample by adding a 200-bit stuffing (meaningless data to the format of 1000 samples/field×19 bits/sample without using the sampling rate converter as above. In this case, however, since the audio data packing/depacking sequence will be long, a large-size FIFO is required. Namely, the least common multiple in the relation between 19 bits and 24 bits is higher than that in the relation between 20 bits and 24 bits, and the FIFO should accordingly be larger in size.

In the foregoing, the present invention has been described concerning the embodiments thereof in compliance with the "Hi-Vision" standard. According to the "Hi-Vision" standard, data different in field frequency from one another are the same in effective area as having been described with reference to FIGS. 6A, 6B and 6C and FIGS. 10A, 10B and 10C, and thus the data are not subjected to any line-conversion filtering by the video clock converters 11 and 12 in FIGS. 5A and 5B. According to the STANDARD standard (SD), however, the frame of a effective area for the 60-fields/sec VTR includes 720 samples×480 lines while that of a valid for the 50-fields/sec VTR includes 720 samples×576 lines. Namely, these VTRs are different in number of scanning lines from each other and hence the data have to undergo a line-conversion filtering. FIGS. 11A and 11B are block diagrams showing together a basic 60-fields/sec VTR according to the STANDARD standard. FIG. 11A shows the recorder section of the VTR and FIG. 11B shows the player section of the VTR. The audio baseband processors 3 and 8 are the same as in the example shown in FIGS. 1A and 1B. This VTR further includes an input baseband processor 15, video compressor 16, ECC encoder and audio/video coupler 17, ECC decoder and audio/video separator 18, video expander 19 and an output video baseband processor 20, which form together an SD data processing block.

FIGS. 12A and 12B are block diagrams showing together a 50-fields/sec VTR designed to accommodate data originated from the 60-fields/sec SD VTR. FIG. 12A shows the recorder section of the VTR and FIG. 12B shows the player section. Also, FIGS. 13A, 13B and 13C show differences among frames of different field frequencies and frames after processed for the field frequency of 50 fields/sec. FIG. 13A shows a frame whose field frequency is 60 Hz, FIG. 13B shows a frame whose field frequency is 50 Hz, and FIG. 13C shows a frame (signal form) resulted from processing of the 50-Hz frame by the video clock converter. As shown in FIGS. 12A and 12B, the video baseband processes 21 and 24 make input and output baseband processing operations, respectively, which are quite different from those made by the video baseband processors 15 and 20 in FIGS. 11A and 11B, respectively, for signals of 60 fields/sec in field frequency because the video baseband processes 21 and 24 are for signals of 50 fields/sec in field frequency and different in number of lines. A video line and clock converter 22 in FIG. 12A corresponds to the video clock converter 11 in FIG. 5A and provides a line conversion filtering to convert the effective frame of 720 samples×576 lines in the 50-fields/sec VTR into an effective frame of 720 samples×480 lines in the basic 60-fields/sec VTR. As shown in FIGS. 13A, 13B and 13C, the video line and clock converter 22 converts the frame and also changes the clock.

A video line and clock converter 23 in FIG. 12B corresponds to the video clock converter 12 in FIG. 5B, and makes a line conversion filtering to convert the effective frame of 720 samples×480 lines in the basic 60-fields/sec VTR into an effective frame of 720 samples×576 lines in the 50-fields/sec VTR, thereby restoring the original number of lines. As shown in FIGS. 13B and 13C, the video line and clock converter 23 converts the frame and also changes the clock. As in the Hi-Vision system, the ECC encoder and audio/video coupler 17, video compressor 16, ECC encoder and audio/video separator 18 and video expander 19 work at a different rate and thus the circuit may be the same as in the basic 60-fields/sec VTR. Also, audio signals can be processed as in the Hi-Vision system, and thus the audio data packing unit 9, audio data depacking unit 10, audio baseband processor 3 and audio baseband processor 8 are quite the same as those n the Hi-Vision system VTR shown in FIGS. 5A and 5B. The above explanation concerns a VTR for SD data. According to the present invention, even data having a frame format not compatible with a VTR for data having a field frequency can be recorded and played by the VTR by designing the VTR to be able to subject the data to the filtering for frame format conversion.

Next, a developed form of the VTR shown in FIGS. 5A and 5B will be described. The audio data depacking unit 10 in the 50-fields/sec VTR shown in FIGS. 5A and 5B is built in the ECC encoder and audio/video separator 5, which is shown in the form of a block diagram in FIGS. 14A and 14B. FIG. 14A shows the recorder section of the VTR and FIG. 14B shows the player section. That is, the VTR shown in FIGS. 14A and 14B can support both data of 60 and 50 fields/sec in field frequency. The only difference between the VTRs in FIGS. 14A and 14B is the ratio between the field frequencies (50/60). For example, the output from the video compressor 2 is 38.6666 MHz=46.4 MHz×50/60.

Figure 15:
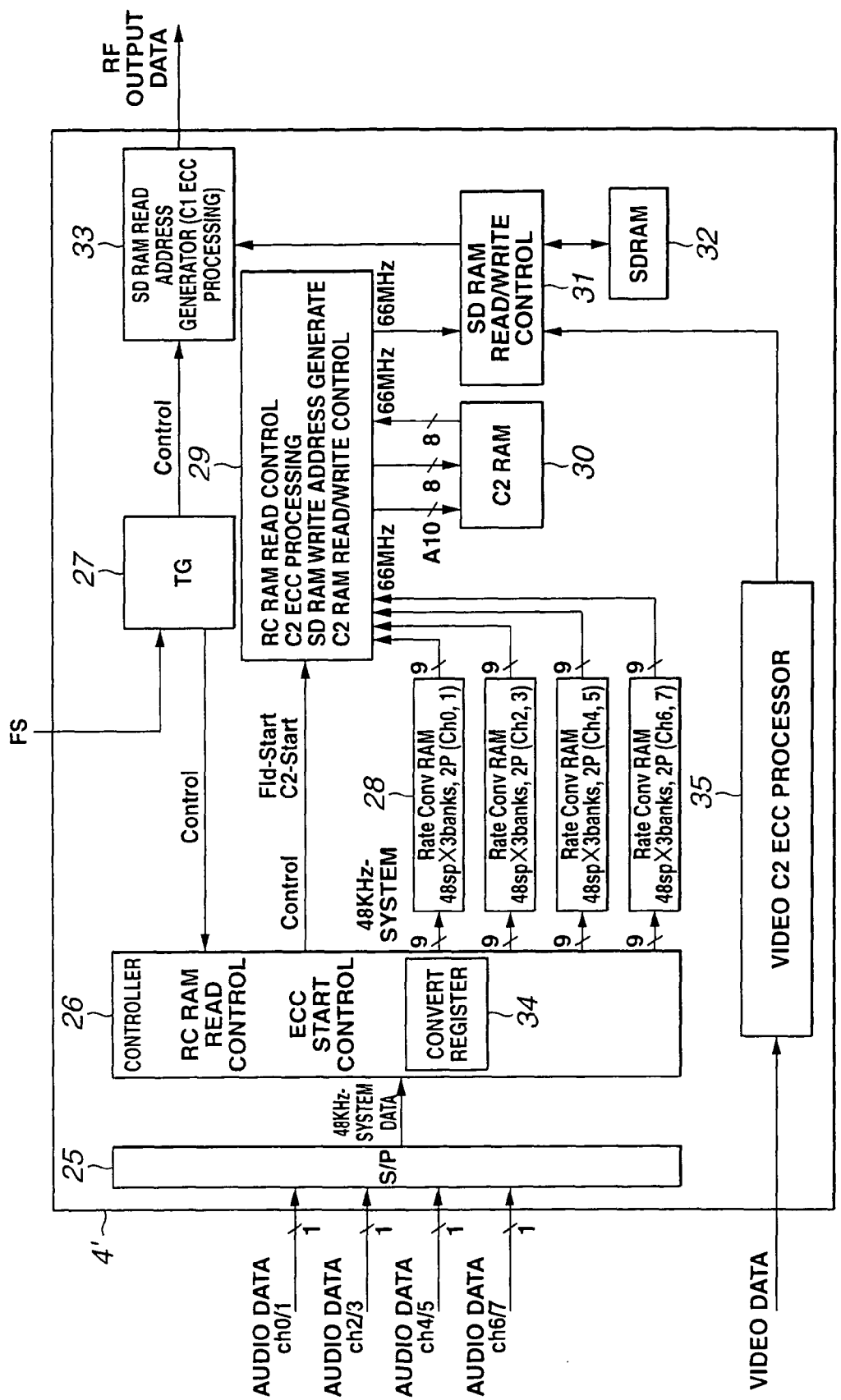
FIG. 15 is a block diagram showing the construction of an ECC encoder and audio/video coupler included in the digital audio/video recorder/player shown in FIGS. 14A and 14B.

The ECC encoder and audio/video coupler 4' is shown in detail in FIG. 15. In this circuit, video data having undergone C2 ECC processing by a video C2 ECC processor 35 is sent to an SD RAM read/write control unit 31. On the other hand, audio data is converted from serial to parallel by a S-P converter 25, and sent to a controller 26. The controller 26 provides RateConv RAM write control (for control over data write to a RateConv RAM 28) and ECC start control (for control over start of a processing by another controller 29). The controller 26 includes a convert register 34, which will be described in detail later. The RateConv RAM (will be referred to as "RC RAM" hereunder) 28 is a dual-port RAM in which clock is switched from the audio 48-kHz system clock to an internal system clock (66 MHz). The controller 29 controls read from the RC RAM 28, C2 RAM 30, adds C2 ECC parity to data and generates a write address in an SD RAM. The SD RAM read/write control unit 31 controls access to an SD RAM 32. There is provided a C1 ECC processor 33 to generate a read address in the SD RAM 32, appends the C1 ECC parity to data, puts the data on an RF clock and provides RF data. There is also provided an audio timing generator 27 to receive a field signal and sampling period (FS) signal and counts them in one field. In this case, since the sampling frequency is 48 kHz in both the data of 60 and 50 fields/sec in field frequency, so 800 samples are counted per field by a counter in the case of 60-fields/sec data to provide a processing timing to the controller 26 and C1 ECC processor 31, while 960 samples are counted per field in the case of 50-fields/sec data to provide a processing timing to the controller 26 and C1 ECC processor 33.

Figure 16:
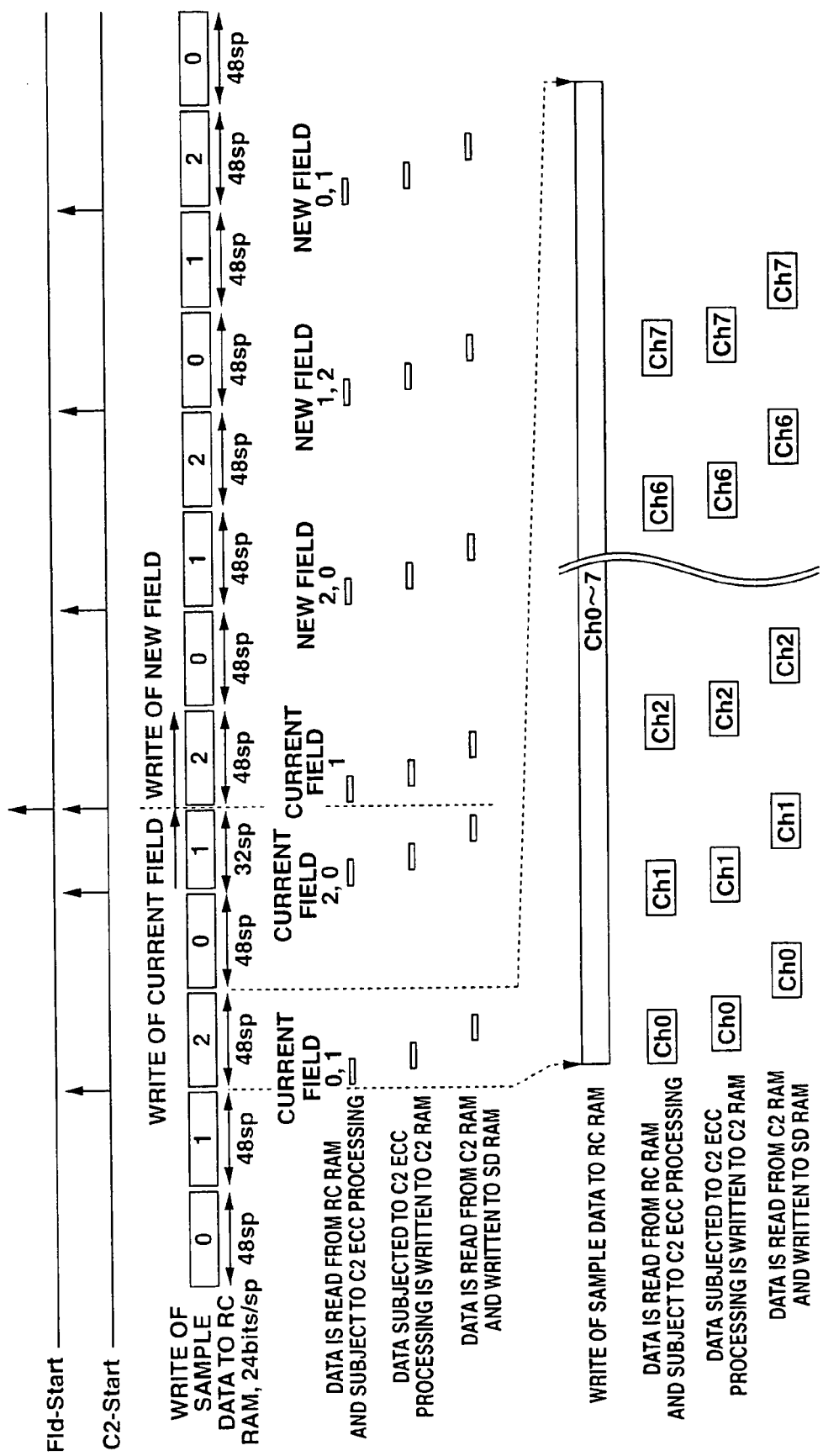
FIG. 16 explains the operations of the ECC encoder and audio/video coupler included in the digital audio/video recorder/player shown in FIGS. 14A and 14B.

FIG. 16 is an audio timing chart of the ECC encoder and audio/video coupler 4', showing the processing of data having a field frequency of 60 fields/sec and including 24 bits per sample. Namely, the timing of processing after 20 bits/sample is converted into 24 bits/sample is shown for the field frequency of 50 fields/sec. First, the audio processing timing for the basic field frequency of 60 fields/sec will be described. The RC RAM 28 consists of three banks each capable of storing 48 samples×24 bits/sample of data. The figures "0", "1" and "2" in FIG. 16 are numbers for the RC RAM banks. As seen from FIG. 16, 800 samples/field=48 samples/bank× 16 banks+32 samples(=1 bank). Audio data is written at an FS (with sampling frequency of 48 kHz) rate to the RC RAM 28. Fld-Start (Field-Start) and C2-Start are processing timing control signals supplied from the controller 26. When the Fld-Start is received, new field data are written to the RC RAM 28. As shown in FIG. 16, the new field data are sequentially written to the RC RAM 28 first into the bank 2 and then the bank 0. When the C2-Start is received, the C2 ECC processing of the banks 2 and 0 starts. With a system clock of 66 MHz, data are read from the RC RAM 28 in the direction of C2. The C2 ECC processing is controlled by the controller 29, a C2 parity is added to the data and the data is written to the C2 RAM 30 in the direction of C2. Upon write of all the data to the C2 RAM 30, data are read from the C2 RAM 30 in the direction of C1, sent along with an SD RAM write address to an SD RAM read/write control unit 31 and written to an SD RAM 32. The processing is done in a time-sharing manner from a channel 0 to 7. The C2-Start is supplied each time data for two banks are written to the RC RAM 28. At the end of a field, the C2-Start is supplied along with the Fld-Start to process data remaining in the current field. At the field end, data for 32 samples, smaller than data for one bank, are processed. The Fld-Start and C2-Start are generated by the controller 26 from a control signal supplied from the audio timing generator 27. Data of 60 fields/sec in field frequency thus undergo the audio ECC encoding. The convert register 34 is not used for any data having the basic field frequency of 60 fields/sec.

Next, signals having a field frequency of 50 fields/sec, supplied to this VTR, will be described. As shown in FIG. 14A, audio data supplied to the ECC encoder and audio/video coupler 4' and having the field frequency of 50 fields/sec has a format of 960 samples/field×20 bits/sample (48 kHz). This data is to be converted into a format of 800 samples/field×24 bits/sample by audio data packing. For this audio data packing, the convert register 34 shown in FIG. 15 is used. The S-P (serial-parallel) converter 25 in FIG. 15 processes data having a format of 960 samples/fields×20 bits/sample similarly to the data having the field frequency of 60 fields/sec to convert the data from serial to parallel. The parallel data is supplied from the S-P converter 25 to the controller 26 with LSB first and in units of 8 bits. For sending data at a rate of 20 bits/sample, the 20 bits. are divided into four LSBs (least significant bits), eight MDBs (middle bits) and eight MSBs (most significant bits), and the data is converted by the converter register 34 into a 24-bit data. The unit of sequence is 960 samples/field× 20 bits/sample. Six samples are taken as one sequence. This sequence is converted into 24 bits/sample×5 samples. That is, six samples/field×20 bits/sample is converted into five samples×24 bits/sample. Therefore, 960 samples/field×20 bits/sample is converted into 800 samples/field×24 bits/sample.

Figure 17:
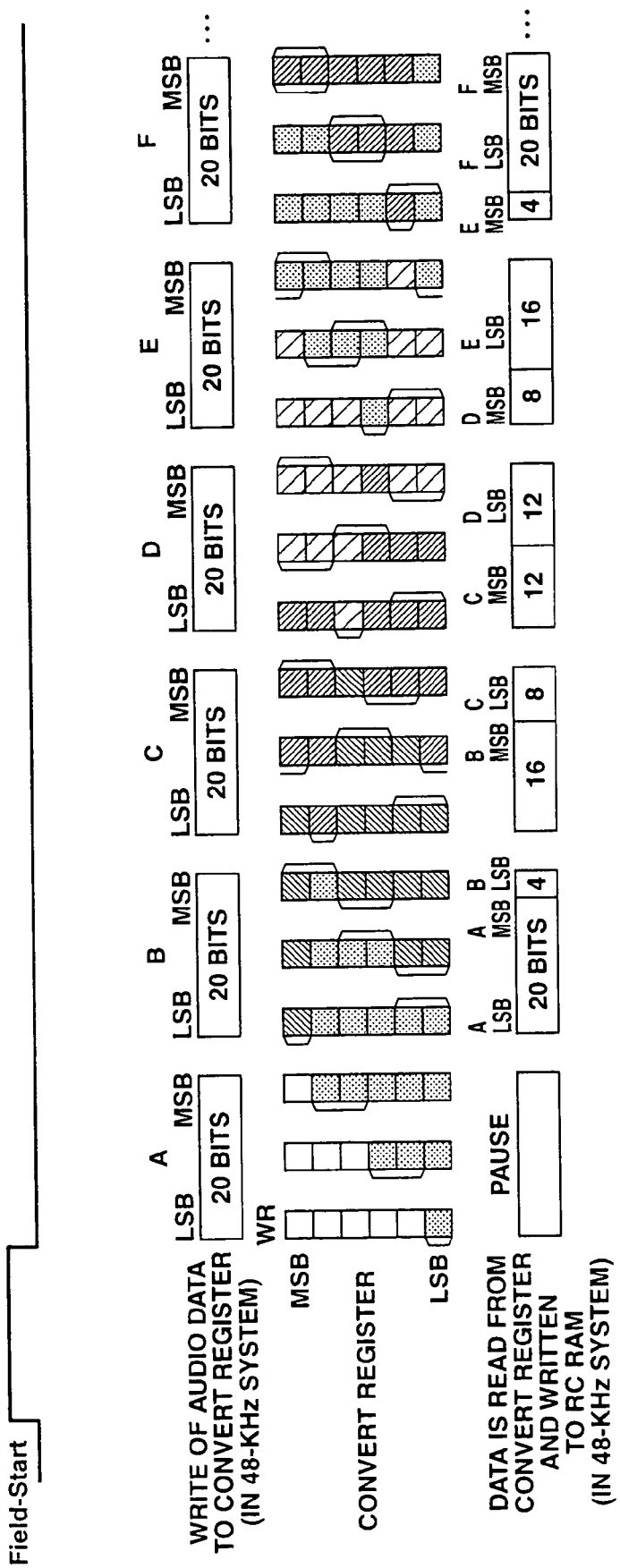
FIG. 17 explains the operations of a convert register included in the ECC encoder and audio/video coupler shown in FIG. 16.

The operation of the convert register 34 will be described herebelow with reference to FIG. 17. The convert register 34 includes 24 registers (for 24 bits). Input data is of 20 bits per sample. As shown in FIG. 17, audio data is written to the register with the control signal Field-Start being as the top of a conversion sequence, with LSB first and densely at the MSB side. As mentioned above, one sample of data is received as four LSBs, eight MDBs and eight MSBs and thus it is written in these three parts to the register. When the data has been written down to the MSB of the register, it is cyclically written at the LSB again. In FIG. 17, bits being written are shown at the left side and bits being read are shown at the right side. As far as the fourth example in FIG. 17 is concerned for example, data is written to only four MSBs while data is read from eight LSBs. It should be noted that when data write to and read from the convert register conflict with each other, the write is preferentially done.

Data is not read from the convert register 34 for the first one sample (pause), and then data is read in units of 8 bits starting with the LSB. The data are to be written to the RC RAM. "A" to "F" in FIG. 17 indicate independent samples, respectively, showing how data are to be packed in the audio data packing. Data is read from the convert register 34 with a 48-kHz clock. In this case, a pause is taken at the leading sample of one sequence. No data is written to the RC RAM 28 during pause in reading the convert register 34. That is, write to the convert register 34 and read from the RC RAM 28 will not be made at every six samples. Also, there is provided an internal counter to generate a C2 ECC processing start control signal, Fld-Start signal and C2-Start signal, which are to be supplied to the controller 29. In the 48-kHz system, the internal counter is so operated as to take pause at every six samples to generate the above signals. The operation of the internal counter for 95 samples (in the 48-kHz system) in 60-fields/sec VTR corresponds to that for 114 samples (in the 48-kHz system) (=95× 6/5) in the 50-fields/sec VTR. In the 60-fields/sec VTR, a C2-Start signal next to the superposition of the Fld-Start and C2-Start signals in FIG. 16 appears at every 96 samples (48-kHz system). In the 50-fields/sec VTR, the counter advances by 95 samples (60 fields/sec) when it has counted 114 samples, takes pause because a next sample comes at the sequence top, and advances by 96 samples (60 fields/sec) when it counts a next sample. That is, the C2-Start signal next to the Fld-Start signal will appear at the 116th sample (114+ 1+1). Thus, the C2 ECC processing is made by the controller 29 at a rate multiplied by the field frequency ratio. It is important at this time that the circuit provided downstream of the RC RAM 28 and controller 29 operates at the rate multiplied by the field frequency ratio because of the RAM write control and processing start control and they need not any circuit modification as in the 60-fields/sec VTR. Also, the rate conversion is made by multiplying a rate by the field frequency ratio by causing the internal counting and control not to be done at every six samples during the audio data packing conversion. Compared with the method in which the audio data packing is done with two clocks of 48 kHz and 40 kHz as shown in FIG. 7A, the rate conversion can be made with only one clock of 48 kHz and by only the 24 registers in the convert register 34.

Figure 18:
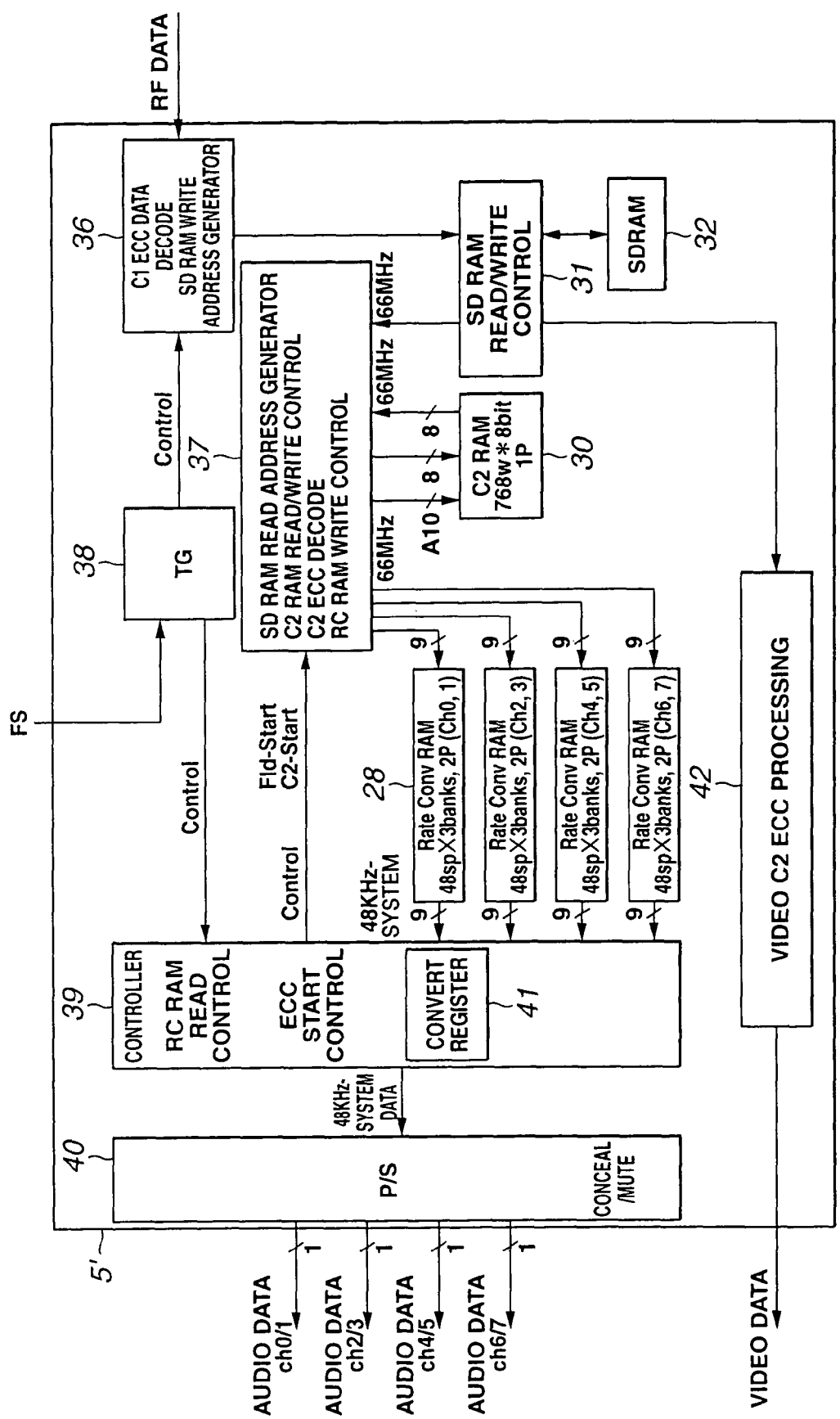
FIG. 18 is a block diagram showing the construction of an ECC decoder and audio/video separator included in the digital audio/video recorder/player shown in FIGS. 14A and 14B.

Next, the internal block construction of the ECC decoder and audio/video separator 5' in the player section will be illustrated and described with reference to FIG. 18. In a C1 ECC decoder 36, RF data undergoes C1 ECC decoding (error correction) and the data thus decoded is written to the SD RAM 32 via the SD RAM read/write control unit 31. The video C2 ECC decoder 42 makes C2 ECC decoding of the video data read by the SD RAM read/write controller 31 from the SD RAM 32 and outputs the data. On the other hand, concerning the audio data, a timing generator (TG) 38 included in the separator 5' is supplied with a field signal and sampling frequency (FS) signal to count one field of data for the audio data. In this case, since the sampling frequency is 48 kHz for both the 60- and 50-fields/sec VTRs, so the counter counts 800 samples per field in the 60-fields/sec VTR to give a timing of operation to a controller 39 and C1 ECC decoder 36. In the 50-fields/sec VTR, the counter counts 960 samples per field to give an operation timing to the controller 39 and C1 ECC decoder 36. The controller 39 generates a C2 ECC decoding timing and sends it to another controller 37. Also, the controller 39 controls read from the RC RAM 28. The controller 39 incorporates a convert register 41 which will be described in detail later. The controller 37 makes C2 ECC decoding according to the C2 ECC decoding start timing signals Fld-Start and C2-Start supplied from the controller 39. The controller 37 reads necessary audio data in the direction of C1 from the SD RAM 32 through the SD RAM read/write control unit 31, and writes it to the C2 RAM 30 in the direction of C1. When the audio data have been cumulated in the C2 RAM 30, the controller 37 will read audio data in the direction of C2 for C2 ECC decoding, and write the audio data having thus undergone the C2 ECC decoding to the RC RAM 28. The operation of the controller 37 and data write to the C2 RAM 30 and RC RAM 28 are done under the control of an internal system clock of 66 MHz. The controller 39 reads audio data from the RC RAM 28 with a clock of 48 kHz. The audio data thus read is sent to an S-P (serial-parallel) converter 40. The S-P converter 40 conceals and mutes the audio data, and then converts the audio data thus processed from parallel to serial. The audio data thus processed is delivered as audio output from the ECC encoder and audio/video separator 5'.

Figure 19:
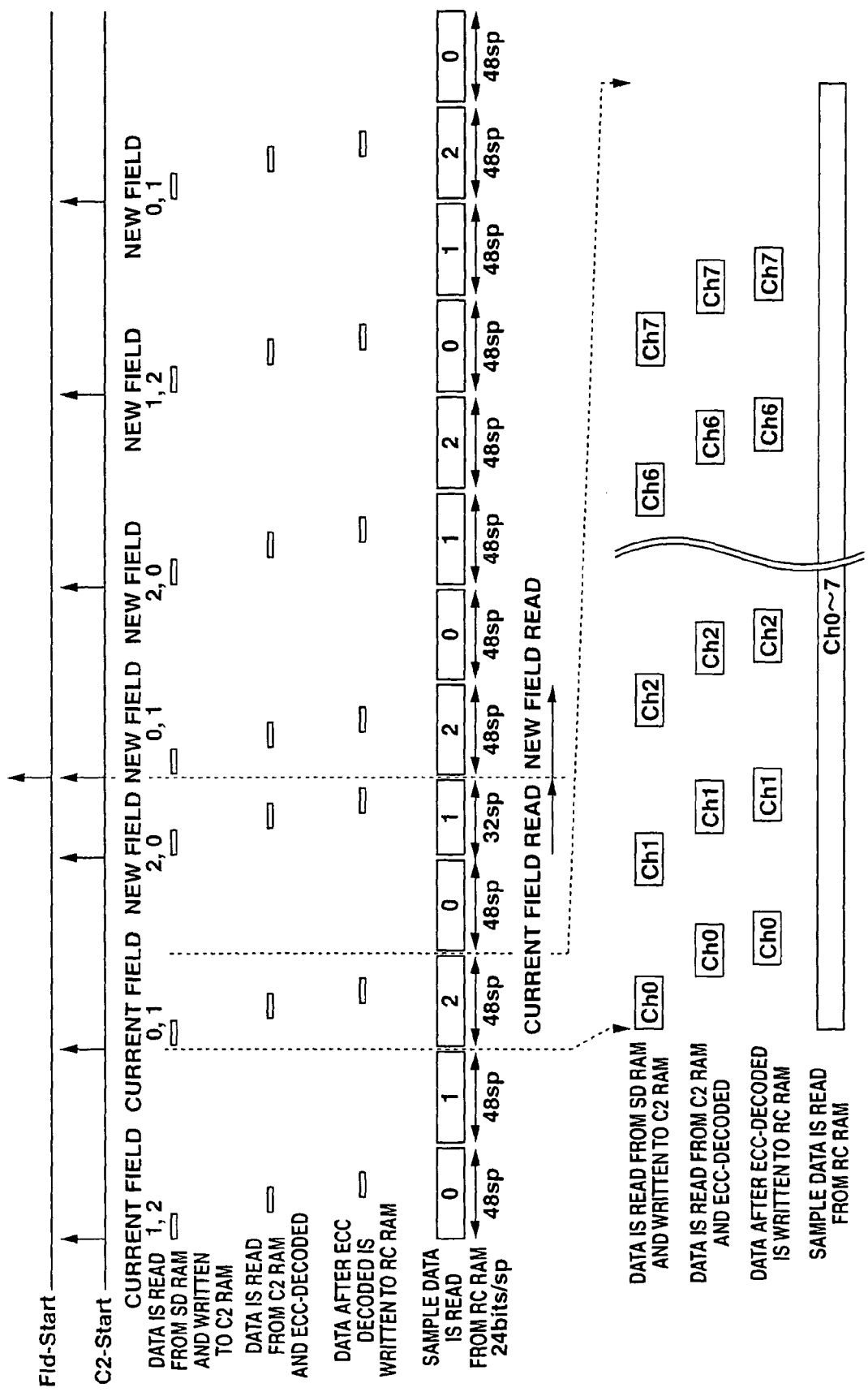
FIG. 19 explains the operations of the ECC decoder and audio/video separator included in the digital audio/video recorder/player shown in FIGS. 14A and 14B.

FIG. 19 is an audio timing chart of the ECC decoder and audio/video separator 5', showing the processing of data having a field frequency of 60 fields/sec and including 24 bits per sample. Namely, the timing of processing before 24 bits/sample is converted into 20 bits/sample is shown for the field frequency of 50 fields/sec. First, the audio processing timing for the basic field frequency of 60 fields/sec will be described. The RC RAM 28 consists of three banks each capable of storing 48 samples×24 bits/sample of data. The figures "0", "1" and "2" in FIG. 19 are numbers for the RC RAM banks. As seen from FIG. 19, 800 samples/field=48 samples/bank×16 banks+32 samples (=1 bank). Fld-Start (Field-Start) and C2-Start are processing timing control signals supplied from the controller 39. When the Fld-Start is received, new field data are read from the RC RAM 28. As shown in FIG. 19, the new field data are sequentially read from the banks 2 and 0 of the RC RAM 28. Then, data are continuously read from the RC RAM 28 at the FS rate. As shown in FIG. 19, data are read cyclically from the banks of the RC RAM 28. The C2-Start signal is basically provided each time data is read from two banks of the RC RAM 28. Since near field data has to be read from the RC RAM 28 once the Fld-Start signal is provided, so new field data read from the first bank is subjected to C2 ECC decoding when a C2-Start signal is received before the Fld-Start signal. In FIG. 19, the bank 2 is the first bank for the new field data and the data undergoes the C2 ECC decoding. In the first processing of the new field data, data for one bank of the RC RAM 28 is first subject to the C2 ECC decoding. When the Fld-Start signal is received, data for the next two banks are processed, and then each time the C2-Start signal is received, data for the two banks are processed. The audio ECC decoding is thus done in the 60-fields/sec VTR. The basic 60-fields/sec VTR does not use the convert register 41.

Next, signals having a field frequency of 50 fields/sec, supplied to this VTR, will be described. As shown in FIG. 14B, audio data supplied to the ECC decoder and audio/video separator 5' and having the field frequency of 50 fields/sec has a format of 960 samples/field×20 bits/sample (48 kHz). The 800 samples/field×24 bits/sample of data is to be converted into a format of 960 samples/field×20 bits/sample by audio data depacking. For this audio data depacking, the convert register 41 shown in FIG. 18 is used. Data read from the RC RAM 28 in FIG. 18 is of 24 bits/sample and has a format of 800 samples/field×24 bits/sample. This data is converted by the convert register 41 into 960 samples/field×20 bits/sample by the audio data depacking. For sending data to the S-P converter 40 at a rate of 20 bits/sample, the controller 39 in FIG. 18 divides the data into four LSBs, eight MDBs and eight MSBs as in the encoding process. The unit of conversion sequence is 960 samples/field×20 bits/sample and six samples are taken as one sequence as in the encoding process. That is, five samples/field×24 bits/sample is converted into six samples×20 bits/sample. Therefore, 800 samples/field×24 bits/sample will be converted into 960 samples/field×20 bits/sample.

The operation of the convert register 41 will be described herebelow with reference to FIGS. 20A and 20B. The convert register 41 includes 24 registers (for 24 bits). Input data is of 24 bits per sample. As shown in FIGS. 20A and 20B, audio data is written to the register with the control signal Field-Start being as the top of a conversion sequence. At this time, for forward playing shown in FIG. 20A, the data is written with LSB first and densely at the MSB side. For reverse playing shown in FIG. 20B, the data is written with MSB first and densely at the LSB side. Also for the forward playing for data read, data is read with LSB first in the direction of MSB. For the reverse playing, the data is read with MSB first in the direction of LSB. For providing data from the controller 39 to the S-P converter 40, the data is divided into four LSBs, eight MDBs and eight MSBs correspondingly to the LSB first or MSB first mode in the reading from the convert register. Therefore, for forward playing, the data is read with LSB first, while for reverse playing, the data is read with MSB first. For data decoding, data is cyclically written to and/or read from the convert register 41 as in the encoding operation. It should be noted that when data write to and read from the convert register 41 conflict with each other, the read is preferentially done.

Data write to the convert register is controlled so that after five samples are written to the convert register, no data is data for one sample. That is, no read from the RC RAM 28, namely, no write to the convert register 41, will be made at every six samples. Also, there is provided an internal counter which generates a C2 ECC processing start control signal, Fld-Start signal and C2-Start signal, which are to be supplied to the controller 37. In the 48-kHz system, the internal counter is so operated as to take pause at every six samples to generate the above signals. The operation of the internal counter for 95 samples (in the 48-kHz system) in 60-fields/sec VTR corresponds to that for 114 samples (in the 48-kHz system) (=95×6/5) in the 50-fields/sec VTR. In the 60-fields/sec VTR, a C2-Start signal next to the superposition of the Fld-Start and C2-Start signals in FIG. 19 appears at every 96 samples (48-kHz system). In the 50-fields/sec VTR, the counter advances by 95 samples (60 fields/sec) when it has counted 114 samples, and advances by 96 samples (60 fields/sec) when it counts a next sample. That is, the C2-Start signal next to the Fld-Start signal will appear at the 115th sample (114+1). Thus, the C2 ECC decoding is made by the controller 37 at a rate multiplied by the field frequency ratio. It is important at this time that the circuit provided downstream of the RC RAM 28 and controller 37 operates at a rate multiplied by the field frequency ratio because of the RAM read control and processing start control and they need not any circuit modification as in the 60-fields/sec VTR. Also, the rate conversion is made at a rate multiplied by the field frequency ratio with the controller 39 caused not to do the internal counting and control at every six samples during the audio data depacking conversion. Compared with the method in which the audio data depacking is done with two clocks of 48 kHz and 40 kHz as shown in FIG. 8A, the rate conversion can be made with only one clock of 48 kHz and by only the 24 registers in the convert register 34.

Figure 21:
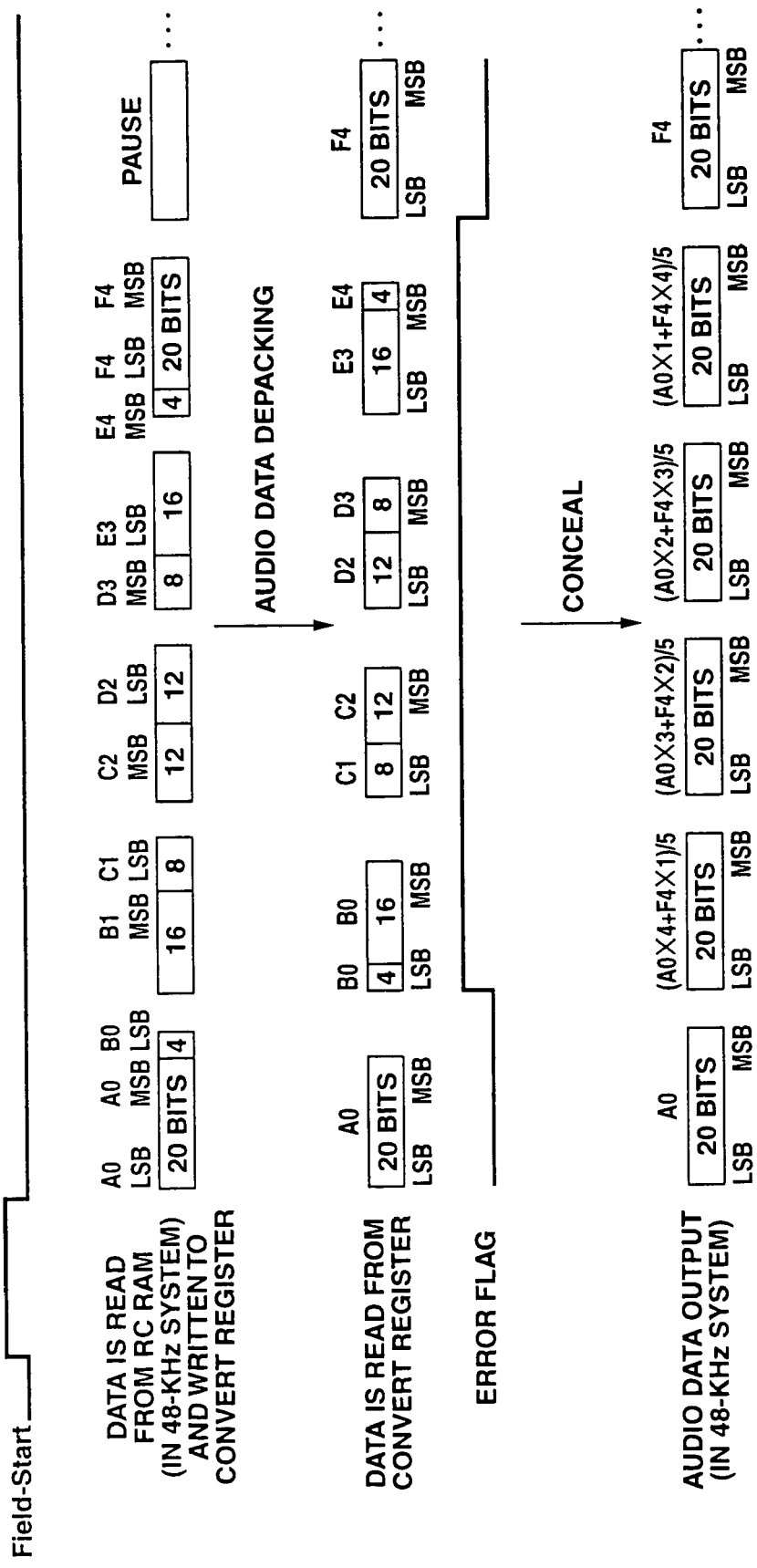
FIG. 21 shows an example of shuttle-play operation made in the digital audio/video recorder/player shown in FIGS. 14A and 14B.

The shuttle play will be considered herebelow. In the shuttle play, various fields of data will be mixed. In the normal play, the ECC blocks shown in FIG. 4B are all in the same field, so that the C2 ECC can be applied to the data. In the shuttle play, however, the sync data (C1-directional data) remain unchanged but sync data in different fields are mixed in the direction of C2, so that the C2 ECC decoding cannot be applied to the data in the shuttle play. Thus, when the audio data is depacked in the shuttle play, the audio data depacking sequence is kept as shown in FIG. 21 but depacked data are in different-fields. It should be noted that the sample data packed in 24 bits by the audio data packing remains unchanged without the bit data in the data pack not in different fields. "A0", "B0", "B1", "C1", "C2", "D2", "D3", "E3", "E4" and "F4" in FIG. 21 are independent sample data. "A" to "F" indicate the numbers for data in the data depacking sequence, and numbers next to these alphabets indicate fields, respectively. Namely, the data are shown depacked in independent field data. As will be seen from FIG. 21, "A0" and "F4" are contained, without any missing, in the first and last data packs, respectively, in five samples (24 bits/sample after packed) in the audio data depacking sequence. That is, it will be seen that these "A0" and "F4" can be restored to their initial forms of 20 bits/sample without any missing even when they are subjected to the audio data depacking. Other than "A0" and "F0" will be concealed as error data by the S-P converter 40 in FIG. 18 because they are in different fields. More specifically, invalid data are interpolated with valid data to provide an output. FIG. 21 shows how the audio data is changed in the above series of operations.

Figure 22:
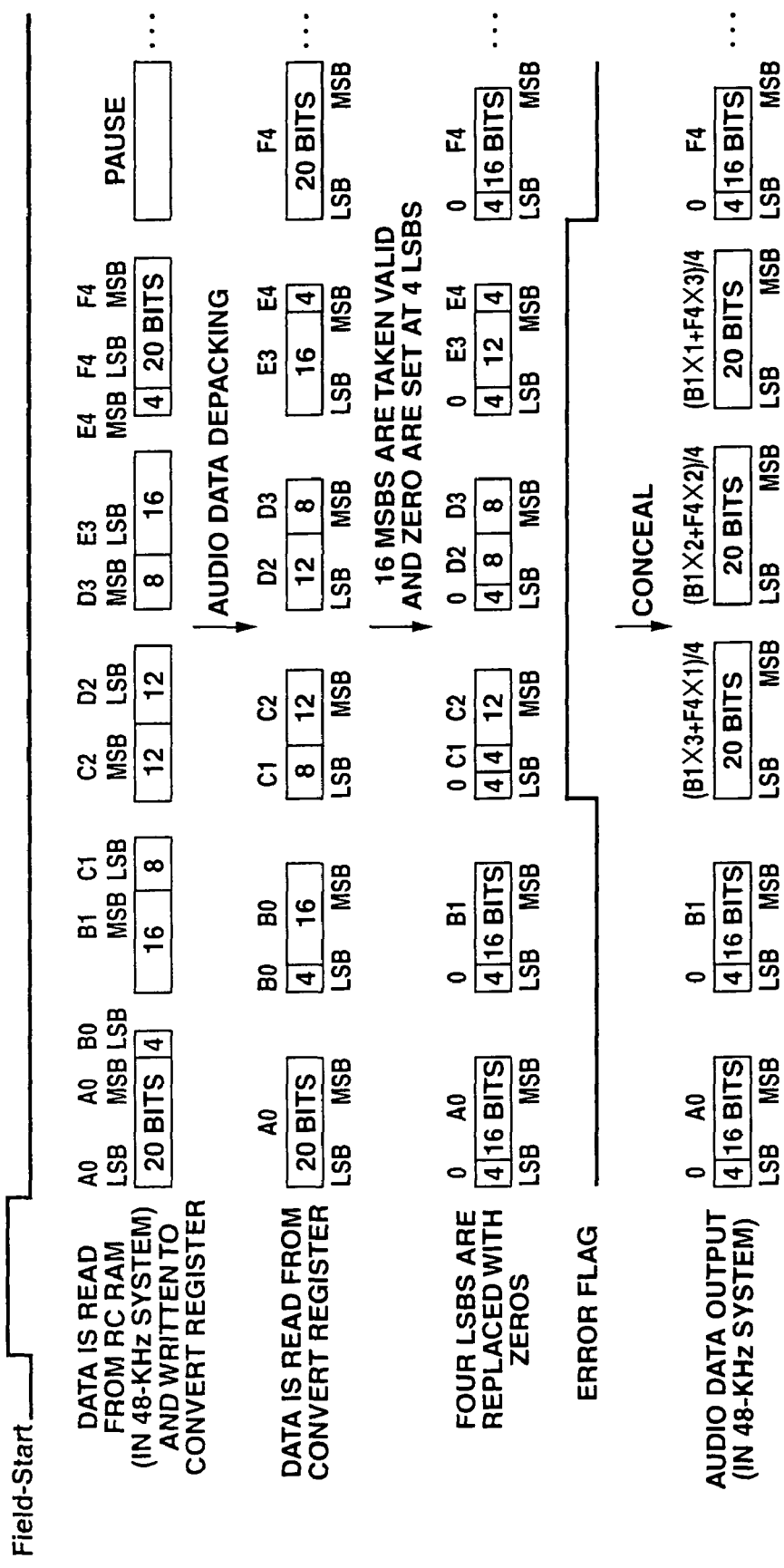
FIG. 22 shows another example of shuttle-play operation made in the digital audio/video recorder/player shown in FIGS. 14A and 14B.

As an application of the above method, any data may be used whose 16 MSBs have been restored to their initial state while all its 20 bits are not restored to the original data without any missing. This will be described with reference to FIG. 22. Of the 20-bit sample data already subjected to the audio data packing, the four LSBs are replaced with zeros to make the 16 MSBs valid. Thus, the "A0", "B1" and "F4" are made valid as shown in FIG. 22. Other than these playable data are concealed as error data as above. In this case, the four LSBs in the "A0" and "F4" whose 20 bits are all playable are replaced with zeros, which is intended for a simple processing. Since all the 20 bits can be played at the start and end of the audio data depacking sequence, so the 20 bits may be used as playable data with the four LSBs not replaced with zeros in these samples.

INDUSTRIAL APPLICABILITY

According to the present invention, it is possible to implement, based on an audio recording/playing apparatus for audio data of a certain field frequency, an audio recording/playing apparatus which can accommodate data of all kinds of field frequencies and audio sampling frequencies without changing the data format. Also, since almost all the operations such as audio baseband processing etc. are the same as in the basic recording/playing apparatus except for the rate which is to be changed, so almost all the circuits of the basic apparatus can be used for the derived recording/playing apparatus. Further, when it is intended to implement an audio recording/playing apparatus compatible with audio data of all the kinds of field frequencies, since almost all the circuits of the basic apparatus can be used with the different field frequencies, so an audio recording/playing apparatus compatible with data of such many field frequencies can be implemented easily.

According to the present invention, the format of audio data can easily be converted by the ECC encoding circuit without having to provide any dedicated device (FIFO) for the audio data format conversion. Also, since it is not necessary to provide the ECC encoding circuit with any clock dedicated for the audio data format conversion, so it suffices to supply a single kind of baseband audio clock to the ECC encoding circuit. Provision of only 24 registers (24 bits) in the ECC encoding circuit permits to implement the data format conversion. Also, just by modifying a part of the control of the ECC encoding circuit, the latter can be made usable as it is for almost all the processing operations after the audio data format conversion (such as the rate convert RAM processing, C2 ECC encoding, etc.), so that little additional circuit is required for such operations.

According to the present invention, the format of audio data can easily be converted by the player-side ECC decoding circuit similarly to the recorder-side ECC encoding circuit without having to provide any dedicated device (FIFO) for the audio data format conversion. Also, since it is not necessary to provide the ECC decoding circuit with any clock dedicated for the audio data format conversion, so it suffices to supply a single kind of baseband audio clock to the ECC decoding circuit. Provision of only 24 registers (24 bits) in the ECC decoding circuit permits to implement the data format conversion. Also, just by modifying a part of the control of the ECC decoding circuit, the latter can be made usable as it is for almost all the processing operations before the audio data format conversion (such as the rate convert RAM processing, C2 ECC decoding, etc.), so that little additional circuit is required for such operations. Also, the recording/playing apparatus thus derived from the basic apparatus can made trick plays such as format variable play and reverse variable play.

The recording/playing apparatus according to the present invention is intended for playing a medium having recorded therein audio data whose format has been converted. In the shuttle play, packed data of different fields are also reproduced. In this case, restoration of the data as they by the reverse format conversion will result in data in which MSBs and LSBs of sample data in quite different fields are synthesized by the reverse format conversion. Therefore, the data will have quite different value from that in the recorded data, and thus the shuttle play sound will be a large noise. To avoid this, all packed audio data are unavoidably muted for shuttle play thereof For shuttle play of the packed audio data in which audio data in different fields are mixed, the shuttle play sound can be produced by providing only valid ones, including a correct bit string, of the sample restored to the specific format by the converter.

According to the present invention, it is possible to implement, based on a video recording/playing apparatus for video data of a certain field frequency, a video recording/playing apparatus which can accommodate data of all kinds of field frequencies and video frames without changing the data format. Also, since almost all the operations such as video baseband processing, video compression, expansion, error-corrective coding, etc. are the same as in the basic recording/playing apparatus except for the rate which is to be changed, so almost all the circuits of the basic apparatus can be used for the derived recording/playing apparatus. Further, when it is intended to implement a video recording/playing apparatus compatible with video data of all the kinds of field frequencies, since almost all the circuits of the basic apparatus can be used with the different field frequencies, so a video recording/playing apparatus compatible with data of such many field frequencies can be implemented easily. In addition, in case the video effective frame in the derived apparatus is the same as in the basic apparatus, all the recording media will have the same format independently of the field frequency. Therefore, even by playing a medium having data recorded therein with a certain field frequency with a different field frequency, a picture can be reproduced.

The invention claimed is:

1. A digital audio recording apparatus, comprising:
an input unit for accepting input audio data having a specific sampling frequency, a specific field frequency, and a specific format and for performing baseband processing of the input audio data;
a processor designed to process audio data having a basic field frequency and a basic format and to perform error-corrective encoding;
an output unit for writing audio data output from the processor to a recording medium; and
a converter provided between the input unit and the processor to convert the first audio data to the second audio data,
wherein, when the specific field frequency is different from the basic field frequency and the specific format is different from the basic format, the converter converts the specific sampling frequency at a ratio between the specific field frequency and basic field frequency and converts the specific format to the basic format before passing the input audio data to the processor;
wherein the processor operates with a clock corresponding to the converted sampling frequency to perform error-corrective encoding of the audio data of the basic format,
wherein the converter converts the specific format to the basic format by jointly changing the number of samples per field and number of bits per sample while maintaining the total number of bits per field,
wherein the total number of bits per field is calculated as the product of the number of samples per field and number of bits per sample, and
wherein the converter converts the specific sampling frequency by changing the number of samples per field.

2. The apparatus as set forth in claim 1, wherein when the total number of bits per field varies between the specific format and the basic format, the converter corrects the number of samples per field by converting the specific sampling frequency of the input audio data, and adjusts the corrected total number of bits per field to the total number of bits per field.

3. The apparatus as set forth in claim 1, wherein when the total number of bits per field varies between the specific format and the basic format, the converter corrects the total number of bits by adding dummy data corresponding to deficit bits to the specific format and adjusts the total number of specific-formatted bits to that of basic-formatted bits.

4. The apparatus as set forth in claim 1, wherein the converter converts the specific format to the basic format by writing audio data consisting of a bit stream of serially arranged samples to FIFO in units of a number of specific-formatted bits, reading the audio data in units of a number of basic-formatted bits, and jointly changing the number of samples per field and number of bits per samples.

5. The apparatus as set forth in claim 4, wherein the converter converts the specific format to the basic format by controlling the write and read of the audio data to and from the FIFO synchronously with the specific field frequency.

6. A digital audio playing apparatus comprising:
an input unit for reading, from a recording medium, audio data having a basic sampling frequency, a basic field frequency, and a basic format;
a processor designed to process the audio data and to operate with a clock corresponding to the basic sampling frequency to decode the audio data for at least error correction of the audio data;
an output unit for performing baseband processing of the audio data output from the processor and for supplying the audio data to a playback device; and
a converter provided between the processor and the output unit for converting the audio data according to a specific sampling frequency, a specific field frequency, and a specific format,
wherein the processor operates with the clock corresponding to the basic sampling frequency of the read audio data to perform error-corrective decoding and expand the audio data,
wherein when the specific field frequency is different from the basic field frequency and the specific format is different from the basic format, the converter restores the audio data to the specific format and converts the basic sampling frequency of the read audio data into the specific sampling frequency at a ratio between the specific field frequency and basic field frequency before passing the audio data to the output unit,
wherein the converter restores the audio data from the basic format to the specific format by jointly changing the number of samples per field and number of bits per sample while maintaining the total number of bits per field,
wherein the total number of bits per field is calculated as the product of the number of samples per field and number of bits per sample, and
wherein the converter converts the basic sampling frequency by changing the number of samples per field.

7. The apparatus as set forth in claim 6, wherein when the total number of bits per field varies between the specific format and the basic format, the converter corrects the number of samples per field by converting the basic sampling frequency of the audio data once restored from the basic format to the specific format, and converts the audio data into the specific format.

8. The apparatus as set forth in claim 6, wherein when the total number of bits per field varies from the specific format to the basic format, the converter restores the audio data to the specific format by adding excess dummy data to the audio data, and converts the audio data into the specific format by removing the dummy data from the audio data.

9. The apparatus as set forth in claim 6, wherein the converter restores the basic format to the specific format by writing audio data consisting of a bit stream of serially arranged samples to FIFO in units of the number of basic-formatted bits, reading the audio data in units of the number of specific-formatted bits, and changing the number of samples per field and number of bits per samples in combination.

10. The apparatus as set forth in claim 9, wherein the converter restores the basic format to the specific format by controlling the write and read of the audio data to and from the FIFO synchronously with the specific field frequency.

11. A digital audio playing apparatus comprising:
an input unit for reading, from a recording medium, audio data having a basic sampling frequency, a basic field frequency, and a basic format;
a processor for processing the audio data and to operate with a clock corresponding to the basic sampling frequency to decode the audio data for at least error correction of the audio data;
an output unit for performing at least baseband processing of the audio data output from the processor and for supplying the audio data to a playback device;
a shuttle play control unit; and a converter provided between the processor and the output unit for converting the audio data according to a specific sampling frequency, a specific field frequency, and a specific format, wherein the processor operates with the clock corresponding to the basic sampling frequency of the read audio data to perform error-corrective decoding and expand the audio data, wherein when the specific field frequency is different from the basic field frequency and the specific format is different from the basic format, the converter restores the audio data to the specific format, converts the basic sampling frequency of the read audio data into the specific sampling frequency at a ratio between the specific field frequency and basic field frequency before passing the audio data to the output unit, and wherein the converter restores the audio data from the basic format to the specific format by jointly changing the number of samples per field and number of bits per sample while maintaining the total number of bits per field, wherein the total number of bits per field is calculated as the product of the number of samples per field and number of bits per sample; and wherein, during shuttle play of audio data of different fields, the shuttle play control unit passes, to the output unit, only valid samples having a correct bit string, of the samples restored by the converter to the specific format.

12. The apparatus as set forth in claim 11, wherein the shuttle play control unit passes, to the output unit, substitute samples obtained by interpolating the valid samples instead of invalid samples having no correct bit string, of the samples restored to the specific format.

13. The apparatus as set forth in claim 11, wherein the shuttle play control unit substitutes zero for an incorrect bit string in at least a part of an invalid samples having correct and incorrect bit strings, among the samples restored to the specific format, and converts the invalid sample into a valid sample.

* * * * *

UNITED STATES PATENT AND TRADEMARK OFFICE
CERTIFICATE OF CORRECTION

PATENT NO.      : 7,603,190 B2          Page 1 of 1
APPLICATION NO. : 10/344866
DATED           : October 13, 2009
INVENTOR(S)     : Takayama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1732 days.

Signed and Sealed this

Fifth Day of October, 2010

David J. Kappos
*Director of the United States Patent and Trademark Office*